United States Patent
Wang et al.

(10) Patent No.: US 12,173,127 B2
(45) Date of Patent: Dec. 24, 2024

(54) COMPOSITE MATERIALS AND FILAMENTS COMPOSED OF THE SAME FOR PRINTING THREE DIMENSIONAL ARTICLES

(71) Applicant: University of South Florida, Tampa, FL (US)

(72) Inventors: Jing Wang, Tampa, FL (US); Vishvajitsinh Kosamiya, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 352 days.

(21) Appl. No.: 16/986,531

(22) Filed: Aug. 6, 2020

(65) Prior Publication Data
US 2021/0040276 A1 Feb. 11, 2021

Related U.S. Application Data

(60) Provisional application No. 62/883,274, filed on Aug. 6, 2019.

(51) Int. Cl.
C08J 3/21 (2006.01)
B33Y 70/10 (2020.01)
(Continued)

(52) U.S. Cl.
CPC ............... *C08J 3/212* (2013.01); *C04B 35/46* (2013.01); *C04B 35/62615* (2013.01); *C04B 35/6262* (2013.01); *C04B 35/63408* (2013.01); *C04B 35/63432* (2013.01); *C04B 41/0072* (2013.01); *C04B 41/46* (2013.01); *C08K 3/22* (2013.01); *C08K 9/06* (2013.01); *H01P 3/16* (2013.01);
(Continued)

(58) Field of Classification Search
None
See application file for complete search history.

(56) References Cited

U.S. PATENT DOCUMENTS

| | | | | |
|---|---|---|---|---|
| 4,711,916 A | * | 12/1987 | Hagiwara | ................ C08K 3/22 |
| | | | | 106/490 |
| 5,609,911 A | * | 3/1997 | Okabe | ................... C04B 35/468 |
| | | | | 501/137 |

(Continued)

FOREIGN PATENT DOCUMENTS

| CN | 110467464 A | * | 11/2019 | ............. B28B 3/003 |
|---|---|---|---|---|
| JP | H06-263914 A | * | 9/1994 | |

(Continued)

OTHER PUBLICATIONS

International Search Report issued for PCT/US2020/045116, mailed Oct. 29, 2020.
(Continued)

*Primary Examiner* — Tamra L. Dicus
(74) *Attorney, Agent, or Firm* — Quarles & Brady LLP

(57) ABSTRACT

Described herein are composite materials composed of ceramic particles coated with a surfactant incorporated within a polymer matrix, methods of making same, filaments composed of the same, and articles printed using the filaments. The composite materials and articles described herein have desirable electronic and thermal properties for use in radio frequency (RF) and millimeter wave devices and demonstrate reliable performance at elevated humidity levels.

18 Claims, 18 Drawing Sheets

(51) Int. Cl.
*B33Y 80/00* (2015.01)
*C04B 35/46* (2006.01)
*C04B 35/626* (2006.01)
*C04B 35/634* (2006.01)
*C04B 41/00* (2006.01)
*C04B 41/46* (2006.01)
*C08K 3/22* (2006.01)
*C08K 9/06* (2006.01)
*H01P 3/16* (2006.01)

(52) U.S. Cl.
CPC ............... *B33Y 70/10* (2020.01); *B33Y 80/00* (2014.12); *C04B 2235/54* (2013.01); *C04B 2235/665* (2013.01); *C08J 2345/00* (2013.01); *C08J 2355/02* (2013.01); *C08K 2003/2241* (2013.01); *C08K 2201/003* (2013.01)

(56) References Cited

U.S. PATENT DOCUMENTS

| | | | | |
|---|---|---|---|---|
| 5,863,468 A | * | 1/1999 | Czubarow | H01C 17/281 |
| | | | | 252/521.5 |
| 6,093,234 A | * | 7/2000 | Zhen | C01G 37/006 |
| | | | | 501/84 |
| 2005/0059757 A1 | * | 3/2005 | Bredt | B33Y 70/10 |
| | | | | 106/443 |
| 2005/0197431 A1 | * | 9/2005 | Bredt | B29C 64/165 |
| | | | | 524/81 |
| 2008/0160302 A1 | | 7/2008 | Asrar et al. | |
| 2009/0140833 A1 | * | 6/2009 | Tan | H01C 7/1006 |
| | | | | 338/21 |
| 2009/0143523 A1 | | 6/2009 | Ishiguro et al. | |
| 2009/0281234 A1 | | 11/2009 | Ando | |
| 2010/0298123 A1 | * | 11/2010 | Shen | C01G 49/08 |
| | | | | 252/301.36 |
| 2016/0136884 A1 | | 5/2016 | Kneale | |
| 2018/0179671 A1 | | 6/2018 | Graley et al. | |
| 2018/0275317 A1 | | 9/2018 | Shimode et al. | |
| 2019/0037969 A1 | * | 2/2019 | Busbee | D06N 3/0088 |
| 2020/0053920 A1 | * | 2/2020 | Ghosh | C08K 3/04 |
| 2020/0270407 A1 | * | 8/2020 | Iyo | B32B 27/08 |

FOREIGN PATENT DOCUMENTS

| | | | | |
|---|---|---|---|---|
| JP | 2008280202 A | * | 11/2008 | |
| JP | 2013136222 A | * | 7/2013 | |
| JP | 2018053009 A | | 4/2018 | |
| WO | WO2012006416 A2 | * | 1/2012 | |
| WO | WO-2013007714 A1 | * | 1/2013 | H01L 33/44 |

OTHER PUBLICATIONS

Castro et al., High-k and Low-Loss Thermoplastic Composites for Fuse Deposition Modeling and their Application to 3D-Printed Ku-band Antennas, IEEE MTT-SInternational Microwave Symposium, p. 1-4, 2016.

* cited by examiner

COMPOSITE MATERIALS AND FILAMENTS COMPOSED OF THE SAME FOR PRINTING THREE DIMENSIONAL ARTICLES

CROSS REFERENCE TO RELATED APPLICATIONS

This application claims priority to U.S. provisional application Ser. No. 62/883,274, filed Aug. 6, 2019. This application is hereby incorporated by reference in its entirety for all of its teachings.

BACKGROUND

At millimeter-wave frequencies, the conduction loss of traditional metallic transmission lines can severely limit the best achievable performance for devices such as antennas, phased antenna arrays, and other front-end modules. There is thus much commercial interest in low-loss and all-dielectric based transmissions lines and devices that are well-suited for millimeter-wave and THz device applications.

SUMMARY

In accordance with the purpose(s) of the present disclosure, as embodied and broadly described herein, the disclosure, in one aspect, relates to composite materials composed of ceramic particles coated with a surfactant incorporated within a polymer matrix, methods of making same, filaments composed of the same, and articles printed using the filaments. The composite materials and articles described herein have desirable electronic and thermal properties for use in radio frequency (RF) and millimeter wave devices and demonstrate reliable performance at elevated humidity levels.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 12B is an expanded view of the boxed area in FIG. 12A.

FIG. 13B is an expanded view of the boxed area in FIG. 13A.

Figure 1A:
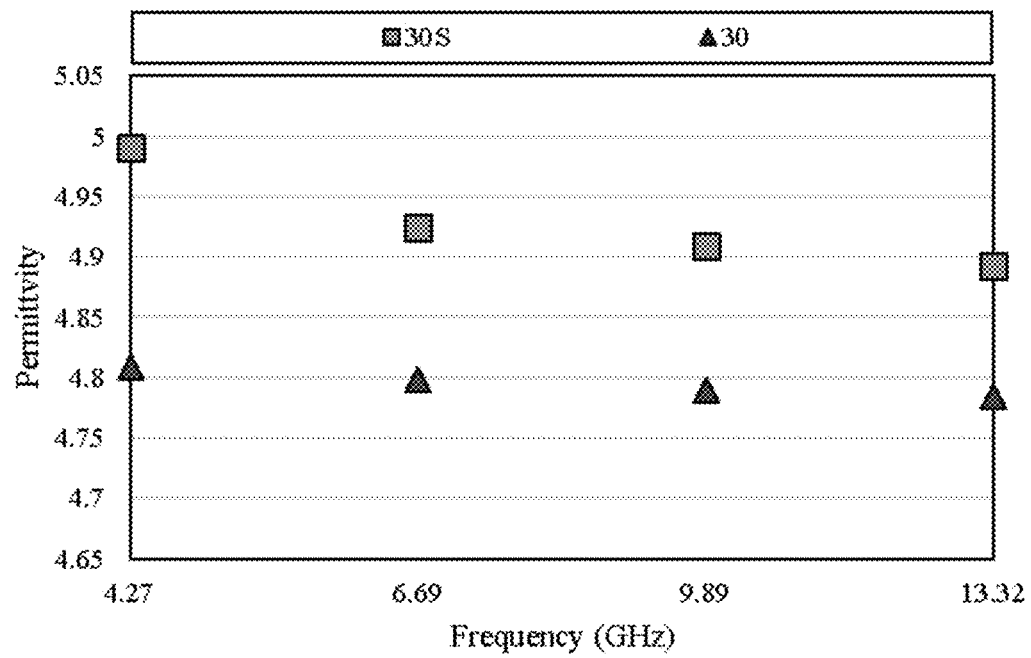
FIGS. 1A-1B are comparisons of the measured permittivity values for exemplary prepared composites 30 and 30S (FIG. 1A) and 40 and 40S (FIG. 1B) vs. frequency, showing that surface modification of ceramic particles increases permittivity of composite. Surface modified samples 30S and 40S are represented by blue squares, while non-modified samples 30 and 40 are represented by red triangles.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a ceramic material," "a polymer," or "an additive," including, but not limited to, mixtures or combinations of two or more such ceramic materials, polymers, or additives, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a surfactant refers to an amount that is sufficient to achieve the desired improvement in the property modulated by the formulation component, e.g. achieving the desired level of permittivity, desired loss tangent, desired glass transition temperature, desired coefficient of thermal expansion, and the like. The specific level in terms of wt % in a composition required as an effective amount will depend upon a variety of factors including the amount and type of filler (e.g., a ceramic material or ceramic particles), amount and type of surfactant used to coat the ceramic, amount and type of polymeric matrix, and any additives present during extrusion to form a 3D printing filament.

As used herein, the terms "optional" or "optionally" means that the subsequently described event or circumstance can or cannot occur, and that the description includes instances where said event or circumstance occurs and instances where it does not.

A "composite material" as disclosed herein is a material made from at least two materials, wherein the materials have significantly different physical and/or chemical properties. In some aspects, the composite material has physical and/or chemical properties different from those of any of the constituent materials. In one aspect, disclosed herein are composite materials including a ceramic material coated with a ceramic and a polymeric matrix.

A "ceramic" as used herein refers to an inorganic solid that is non-metallic but that contain metal and/or non-metal compounds and exhibit resistance to high temperatures, relatively low densities, and hardness as well as brittleness. In one aspect, a ceramic is chemically stable. In a further aspect, ceramics useful herein include, but are not limited to, $TiO_2$.

As used herein, "alkyl group" is a branched or unbranched saturated hydrocarbon group of 1 to 25 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. In one aspect, the alkyl group is a branched or unbranched $C_1$ to $C_{10}$ group.

As used herein, "alkylene group" is a branched or unbranched saturated hydrocarbon group of 1 to 25 carbon atoms, such as methylene, ethylene, n-propylene, isopropylene, n-butylene, isobutylene, t-butylene, pentylene, hexylene, heptylene, octylene, decylene, tetradecylene, hexadecylene, eicosylene, tetracosylene and the like. In one aspect, the alkyl group is a branched or unbranched $C_1$ to $C_{10}$ group.

As used herein, "calcination" refers to heating a material to an elevated temperature in order to change the crystalline phase of the material. In some aspects, in the processes disclosed herein, ceramic powders are calcined at about 800° C. to about 1,500° C. prior to coating the ceramic powders with surfactant.

As used herein, "admixing" refers to mixing two or more components together so that there is either no chemical reaction or physical interaction between the components or, in the alternative, there is a chemical reaction or physical interaction between the components.

A "thermoplastic" polymer as referred to herein is a polymeric substance that softens upon heating and hardens or resolidifies upon cooling. In another aspect, thermoplastic polymers are able to repeat the softening and resolidification over repeated heating and cooling cycles. In one aspect, the composite materials disclosed herein include a thermoplastic polymer.

A "surfactant" as used herein refers to a substance that alters the interaction between two substances at an interface between the two substances. In one aspect, a surfactant is used herein to coat ceramic particles, thereby altering the interaction between ceramic particles and a thermoplastic polymeric matrix containing the ceramic particles.

In one aspect, a "coefficient of thermal expansion" or "CTE" refers to how the size of an object changes with a change in temperature. In one aspect, if a device is fabricated from two or more materials, all materials should have similar CTE values to prevent device damage and/or failure with temperature change.

"Glass transition" as used herein refers to a reversible transition in an amorphous or semi-crystalline material from a harder, more brittle state to a viscous or more rubbery state as temperature increases. "Glass transition temperature," meanwhile, refers to the range of temperatures over which this transition occurs.

"Radio frequency" or "RF" refers to a frequency range from about 20 kHz to about 300 GHz. An "RF device" is an electronic device capable of transmitting or receiving radio signals. In some aspects, RF devices are useful for wireless communications. "Millimeter wave" or "mm-wave" refers to a frequency range of from about 30 GHz to about 300 GHz, which typically have wavelengths from about 10 mm to about 1 mm.

"Permittivity" as used herein is a measure of the electric polarizability of a dielectric substance. In one aspect, a material with a high permittivity polarizes more in response to an applied electromagnetic signal than a material with low permittivity. "Dielectric constant," meanwhile, refers to the ratio of a substance's permittivity to the permittivity of free space (~$8.854 \times 10^{-12}$ F/m) and represents the real part of the complex permittivity, while "dielectric loss" is the phenomenon of a dielectric material's dissipation of electromagnetic energy (e.g., by heat). "Loss tangent" is a measurement of signal loss due to dielectric loss and represents the ratio between the imaginary part and the real part of the complex permittivity.

"Reflection loss" as used herein refers to the reflection of a portion of energy in a transmitted signal back to its source. "Transmission loss," meanwhile, refers to decrease in waveform energy as a signal wave propagates through a medium. "Total loss" refers to the sum of signal power that is not delivered to the receiver of a communication and can include reflection loss and transmission loss as well as other loss components.

As used herein, "room humidity" refers to the amount of water in the atmosphere at room temperature, or about 25° C. In one aspect, at 25° C., one cubic meter of air can hold a maximum of about 22 g of water. Thus, at 25° C., if air contains 22 g of water per $m^3$, relative humidity is 100%, while 11 g of water per $m^3$ would be relative room humidity of about 50% and 4.4 g of water per $m^3$ would be a relative room humidity of about 20%.

Unless otherwise specified, temperatures referred to herein are based on atmospheric pressure (i.e. one atmosphere).

Composite Materials

In one aspect, disclosed herein are composite materials incorporating ceramic powders. In a further aspect, the ceramic powders are surface modified prior to mixing with other components of the composite materials. In some aspects, the ceramic powders can be or include $TiO_2Al_3Mg_3B_{56}$, $(AlN)_x \cdot (Al2O3)_{1-x}$, $BaTiO_3$, $BeO$, $Bi_2Sr_2Ca_{n-1}Cu_nO_{2n+4+x}$, $Bi_{12}TiO_{20}$, $Bi_4Ti_3O_{12}$, $Bi_2Ti_2O_7$, $BN$, $3CaO \cdot Al_2O_3$, $12CaO \cdot 7Al_2O_3$, $CaO \cdot Al_2O_3$, $CaO \cdot 2Al_2O_3$, $CaO \cdot 6Al_2O_3$, $CeB_6$, $Dy_2Ti_2O_7$, $GeO_2$, $HfB_2$, $Ga_5La_3O_{14}Si$, $LaB_6$, $La_{1-x}Sr_xMnO_3$, $LaYbO_3$, $Pb(Sc_xTa_{1-x})O_3$, $Pb(Zr_xTi_{1-x})O_3$, $MgB_2$, $MgO$, $MoSi_2$, $NbB_2$, $SiB_3$, $SiB_4$, $SiB_6$, $SiC$, $SiO_2$, $Si_3N_4$, $Si_2N_2O$, $Na_{0.5}Bi_{0.5}TiO_3$, $SrTiO_3$, $WSi_2$, $W_2N$, $WN$, $WN_2$, $YBa_2Cu_3O_7$, $ZnO$, $ZrO_2$, another ceramic material, or a combination thereof. In some aspects, surfactant assisted ball milling can be used for surface modification. In one aspect, surfactant assisted ball milling allows for the formation of a layer of surfactant on ceramic powders and particles.

In one aspect, surface modifications can decrease particle agglomeration before and/or during the mixing process. In another aspect, surface modifications can improve the interface between other components of the composite material and the ceramic powders or fillers. In still another aspect, other components can include, but are not limited to, a polymeric matrix. In one aspect, surface modifications of the ceramic powers can improve the interface with a polymeric matrix which can, in turn, affect the dielectric properties of the composite materials. In another aspect, the polymeric matrix can include cycloolefin polymer (COP), high-density polyethylene, low-density polyethylene, polycarbonate, acrylic polymers and copolymers such as polymethyl methacrylate (PMMA) and ethylene-co-methacrylic acid (EMAA), polyamide, polystyrene, polypropylene, acrylonitrile butadiene styrene (ABS), polyester, acetal copolymer polyoxymethylene, acetal homopolymer polyoxymethylene, polyvinyl chloride (PVC), polybenzimidazole, a thermoplastic polyurethane, ethylene vinyl alcohol, polyacetal, polyacrylonitrile, polyamide-imide, polyaryletherketone, polybutadiene, polybutylene, polydicyclopentadiene, polyketone, polyetheretherketone, polyetherimide, polyethersulfone, polyphenylene oxide, polyphenylene sulfide, polyphthalamide, polysulfone, polyvinylidene chloride, or a combination thereof.

In one aspect, the polymeric matrix can be a cyclic olefin copolymers based on different types of cyclic monomers and polymerization methods. In one aspect, In one aspect, the cyclic olefin copolymers are produced by chain copolymerization of an unsaturated cyclic monomers having from 3 to 15 carbon atoms (e.g., norbornene, tetracyclododecene) with an unsaturated C2 to C6 monomer (e.g., ethene, propene, butene, etc.) (such as TOPAS Advanced Polymer's TOPAS, Mitsui Chemical's APEL). In another aspect, the cyclic olefin polymers can be a homopolymer. In one aspect, the homopolymer can be produced by ring-opening metathesis polymerization of a cyclic monomer having from 3 to 15 carbon atoms followed by hydrogenation (Japan Synthetic Rubber's ARTON, Zeon Chemical's Zeonex and Zeonor).

In one aspect, the polymeric matrix can exhibit extremely low water absorption such as, for example, less than 0.01% in 24 h. In another aspect, the polymeric matrix can exhibit high transparency such as, for example, 92% for light having wavelengths of from 400 to 800 nm. In still another aspect, the polymeric matrix can have a specific gravity of from about 0.95 to about 1.02.

In still another aspect, surface modification can be accomplished through the incorporation of a surfactant. In one aspect, the surfactant can be present in an amount of from about 0.1 mL to about 1 mL per 10 g of ceramic particles, or at about 0.1, 0.2, 0.3, 0.4, 0.5, 0.6, 0.7, 0.8, 0.9, or about 1 mL per 10 g of ceramic particles, or a combination of any of the foregoing values, or a range encompassing any of the foregoing values.

In some aspects the surfactant can be a hydrophobic surfactant such as, for example, a nonionic surfactant. In one aspect, the surfactant is an aminosilane, which is a compound that possesses a substituted or unsubstituted amino group and a substituted or unsubstituted silane group. In one aspect, the aminosilane has the formula

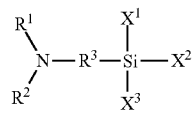

where $R^1$ and $R^2$ are independently, an alkyl group or hydrogen; $R^3$ is an alkylene group; and $X^1$, $X^2$, and $X^3$ are, independently, $R^4$, $R^5$, R, $OR^4$, $OR^5$, OR, where $R^4$, $R^5$, and $R^6$ are hydrogen or an alkyl group. In one aspect, $R^1$ and $R^2$ are hydrogen. In one aspect, $R^3$ is ethylene or propylene. In one aspect, $R^3$ is ethyl or propyl. In another aspect, the aminosilane is γ-aminopropyltriethoxysilane, γ-aminopropyldiethoxymethylsilane, γ-aminopropyldimethylethoxysilane, γ-aminopropyltrimethoxysilane, another hydrophobic surfactant, or a combination thereof. In any aspect, the surfactant can coat the ceramic particles. In one aspect, any surfactant that adheres to both the thermoplastic polymeric matrix and the ceramic material can be used.

In one aspect, the composite materials disclosed herein exhibit high volume loading of ceramic particles in a polymeric matrix. In one aspect, the maximum ceramic filler percentage for this type of system is limited to about 74% of the total volume of the composition. In another aspect, when packing of the ceramic particles/ceramic filler is random, approximately 64% filler volume can be achieved. In one aspect, in the composite materials disclosed herein, the ceramic particles are present in an amount of from about 15 to about 80 vol %, or about 15, 20, 25, 30, 35, 40, 45, 50, 55, 60, 65, 70, 75, or about 80 vol %, or a combination of any of the foregoing values, or a range encompassing any of the foregoing values. In one aspect, the ceramic particles can be present in an amount of from about 30 vol % to about 70 vol %, or from about 30 vol % to about 50 vol %. In one aspect, the ceramic particles are present in an amount of about 30 vol %. In some aspects, high volume loading of ceramic particles enables higher permittivity values for the composite materials. In other aspects, high volume loading of ceramic particles may negatively affect brittleness and printability of the composite materials. In a further aspect, however, inclusion of an additive such as, for example, a plasticizer during the process of extruding the composite materials into 3D printing filaments can restore printability and reduce brittleness of the composite materials. In one aspect, the additive can be a maleic anhydride grafted polypropylene wax such as those sold under the trade name Licocene PP MA 7452 (Clariant, Muttenz, Switzerland), another additive, or a combination thereof. In one aspect, the additive is incorporated at about 5 vol % during the 3D filament extrusion process. In another aspect, the additive is incorporated at less than about 10 vol % during the 3D filament extrusion process.

In one aspect, disclosed herein is a composite material including about 30 vol % $TiO_2$, cycloolefin copolymer, γ-aminopropyltriethoxysilane, and about 5 vol % of a maleic anhydride grafted polypropylene wax.

Process for Preparing the Composite Materials

Figure 15:
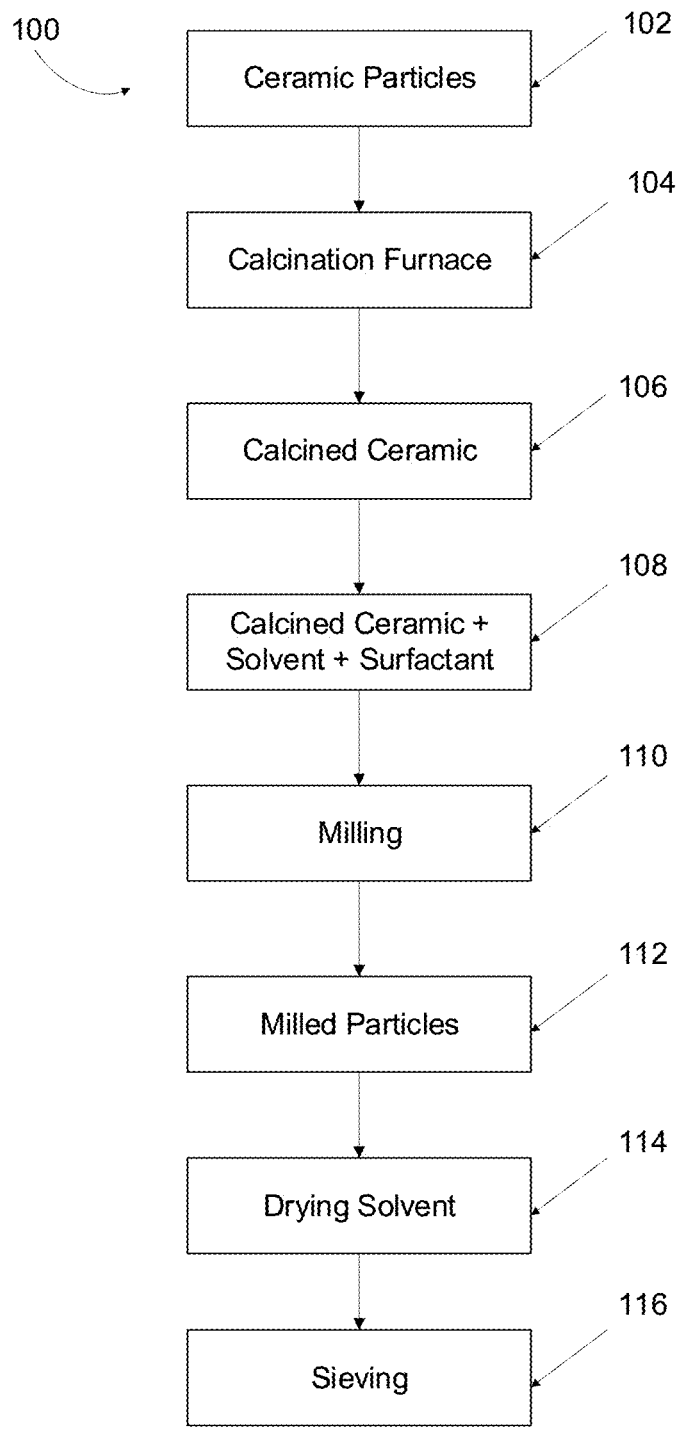
FIG. 15 is a flow diagram of a process as disclosed herein whereby commercial ceramic particles are milled in the presence of a surfactant to produce composite particles useful in forming 3D printing filaments.

FIG. 15 is a flow diagram of a process 100 as disclosed herein whereby commercial ceramic particles are milled in the presence of a surfactant to produce composite particles useful in forming 3D printing filaments. In some aspects, the ceramic particles can be or include $TiO_2$. Ceramic particles 102 are calcined in a calcination furnace 104 to form a calcined material or calcined ceramic 106. In one aspect, the ceramic material can be calcined at about 1100° C. In another aspect, the ceramic material can be calcined for about 2 hours. The calcined material, a solvent, and a surfactant 108 are placed into a mill 110 such as, for example, a ball mill to form a first admixture. In some aspects, the solvent can be ethanol, methanol, acetone, 1-propanol, allyl alcohol, isopropanol, n-butanol, isobutanol, sec-butanol, tert-butanol, 1-pentanol, isoamyl alcohol, 2-methyl-1-butanol, neopentyl alcohol, 2-pentanol, 3-methyl-2-butanol, 3-pentanol, tert-amyl alcohol, or a combination thereof. In some aspects, ball milling can be performed using zirconia balls for mixing. In another aspect, ball milling can be performed with a 4:1 ball (e.g., zirconia) to ceramic weight ratio. In some aspects, 40 g of zirconia balls are used for every 10 g of ceramic. In other aspects, the surfactant can be γ-aminopropyltriethoxysilane. In one aspect, the first admixture can be milled for about 18 hours. Milled particles 112 including ceramic coated with surfactant are dried to remove the milling solvent 114 and sieved 116 to remove large diameter particles. In one aspect, the first admixture is dried at about 60° C. In another aspect, the coated particle composition can be sieved using a 400 mesh sieve. In one aspect, the average particle diameter of the sieved coated particle composition is smaller than the average particle diameter of the coated particle composition before sieving is conducted. In still another aspect, the sieved coated particle composition has an average particle diameter of less than or equal to about 40 μm when a 400 μm nozzle is used for 3D printing, or about 10 μm, 15 μm, 20 μm, 25 μm, 30 μm, 35 μm, or less than equal to about 40 μm, where any value can be a lower or upper endpoint of a range (e.g., 20 μm to 35 μm).

In one aspect, particle size can vary. In a further aspect, particle size can be about 10% of the width of the nozzle used for 3D printing of filaments formed from the composite material. Further in this aspect, for example, if a 100 μm nozzle size Is used for printing, the average particle diameter should be about 10 μm or less. In any of these aspects, a sieve having the proper mesh level can be selected based on the desired printing nozzle size.

In an alternative aspect, a roller mill can be used for large-scale production of the ceramic materials. In a further aspect, milling time may vary based on container size and milling speed.

Figure 16:
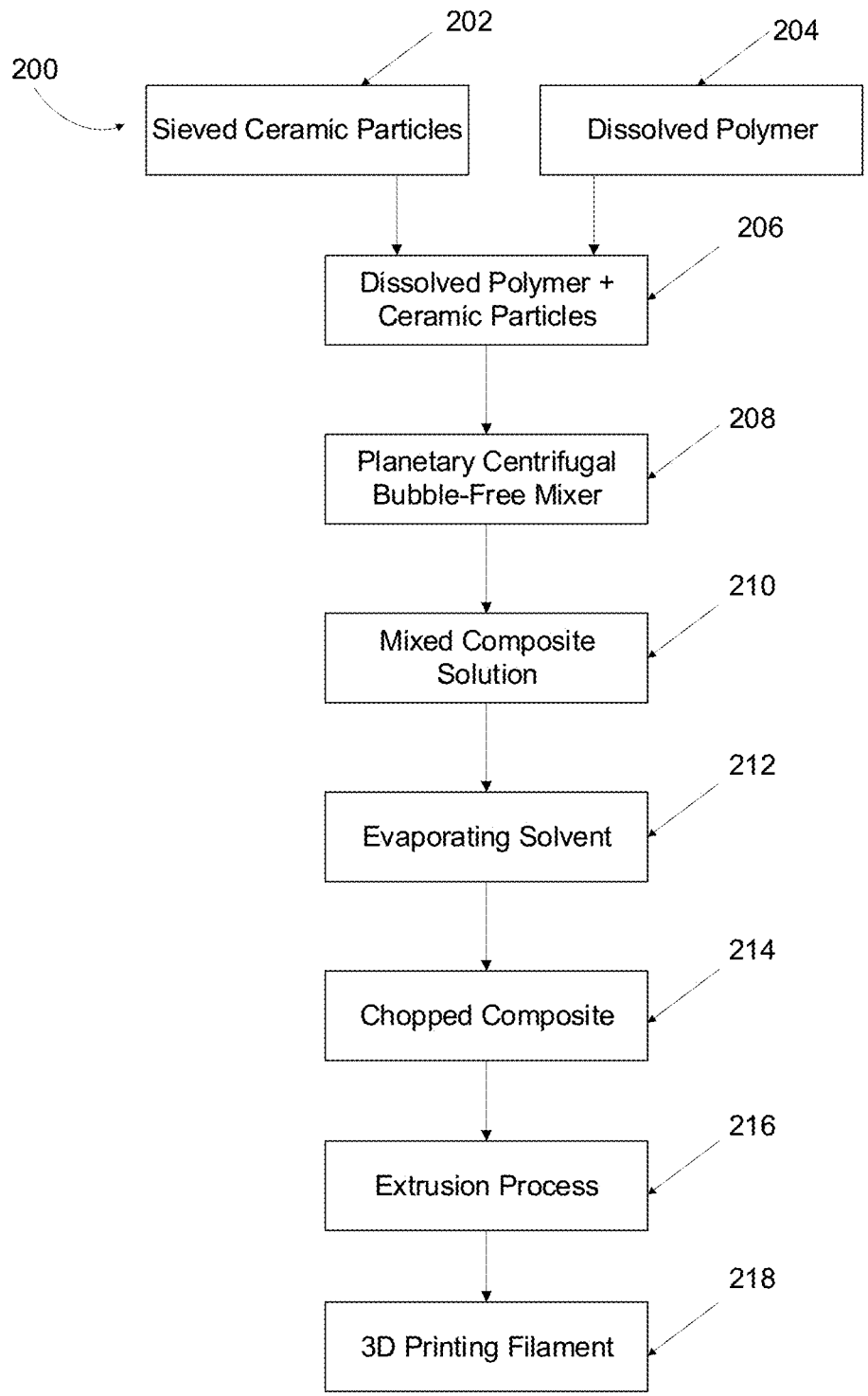
FIG. 16 is a flow diagram of a process of preparing 3D printing filaments using the composite particles produced by the process of FIG. 15.

FIG. 16 is a flow diagram of a process 200 for preparing 3D printing filaments using the composite particles produced by the process of FIG. 15. Surface modified and sieved ceramic particles 202 and polymer dissolved in a solvent 204 are mixed 206 and placed in a mixer 208 such as, for example, a planetary centrifugal bubble-free mixer. In one aspect, the polymer can be cycloolefin polymer. In another aspect, the solvent can be cyclohexane. Instill another aspect, the dissolved polymer and the coated ceramic particles can be mixed at about 2000 rpm for about 10 minutes. Mixed composite solution 210 is removed from the mixer and the solvent is evaporated 212. In one aspect, the solvent is evaporated by drying the mixture in a fume hood, by baking the mixture, or a combination thereof. The resulting composite 214 is chopped and extruded 216 to form a filament suitable for 3D printing 218. In one aspect, an additive can be added during the extrusion process to improve flowability of the filament. In some aspects, the additive can be a maleic anhydride grafted polypropylene wax or another additive. In some aspects, the additive is present in about 5 vol %. In any of these aspects, the ceramic material is present in an amount of from about 15 to about 80 vol % of the composite material, or at about 15, 20, 25, 30, 35, 40, 45, 50, 55, 60, 65, 70, 75 or about 80 vol %, of a combination of any of the foregoing values, or a range encompassing any of the foregoing values. In some aspects, the ceramic material is present at about 30 vol %.

The composite materials described herein are composed of coated ceramic particles that are evenly or homogeneously dispersed throughout the polymer matrix. Thus, the composite materials described herein possess uniform properties throughout the filaments and three dimensional articles produced from the composite materials.

Filaments and Articles

The composite materials described herein can be used to produce filaments useful in 3D printing of articles. In one aspect, the filaments can be produced using extrusion techniques known in the art for producing 3D printing filaments. As discussed above, one or more additives can be added to the composite material prior to or during extrusion. In one aspect, the filament has a diameter of from about 1.0 mm to about 3.0 mm, or about 1.0 mm, about 1.2 mm, about 1.4 mm, about 1.6 mm, about 1.8 mm, about 2.0 mm, about 2.2 mm, about 2.4 mm, about 2.6 mm, about 2.8 mm, or about 3.0, where any value can be a lower or upper endpoint of a range (e.g., about 1.6 mm to about 2.0 mm). In another aspect, the filament has a diameter of about 1.7 mm or of about 3.0 mm. In some aspects, the diameter given includes a tolerance of ±about 0.15 mm.

The filaments described herein can be used to produce three dimensional printed article. In one aspect, the three dimensional printed article can be produced by fused deposition modeling (FDM) or techniques for producing three dimensional articles. In some aspects, the three dimensional printed articles can be dielectric wave guides (DWG), $K_u$ band antennas, power splitters, feeding structures for dielectric antenna arrays, phase shifters, dielectric lens antennas, chip-to-chip interconnects, or another radio frequency device. In any of these aspects, the three dimensional printed article can have an average surface roughness of about 10 μm or less, or of about 5 μm or less, or of about 10, 9, 8, 7, 6, 5, 4, 3, 2, or about 1 μm, or a combination of any of the foregoing values, or a range encompassing any of the foregoing values. In some aspects, post-printing surface processing such as, for example, thermal annealing or mechanical polishing, can be performed. In a further aspect, following printing with or without post-printing surface processing, surface roughness can be about 2 μm, about 1 μm, or less than about 1 μm.

Figure 14A:
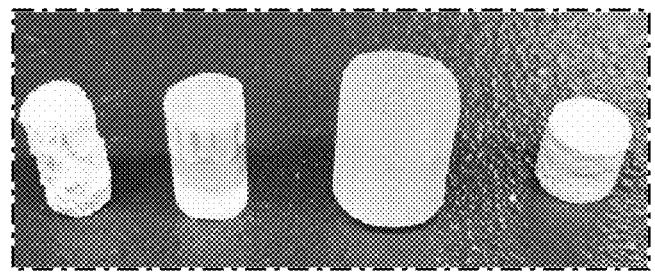
FIG. 14A shows cylinders 3D printed from exemplary composites as disclosed herein.
Figure 14B:
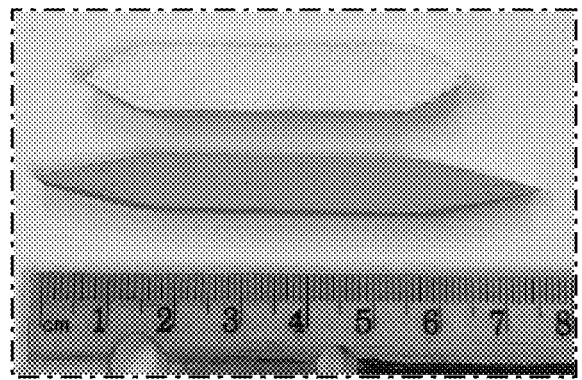
FIGS. 14B-14C show, respectively, exemplary 3D printed DWGs and a 3D printed DWG in experimental use.
Figure 14C:
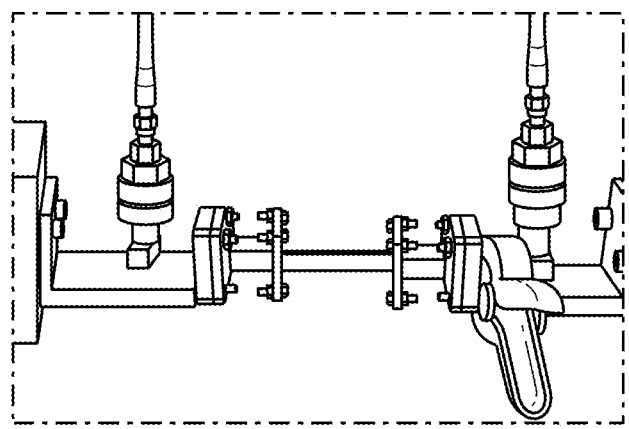
Figure 17:
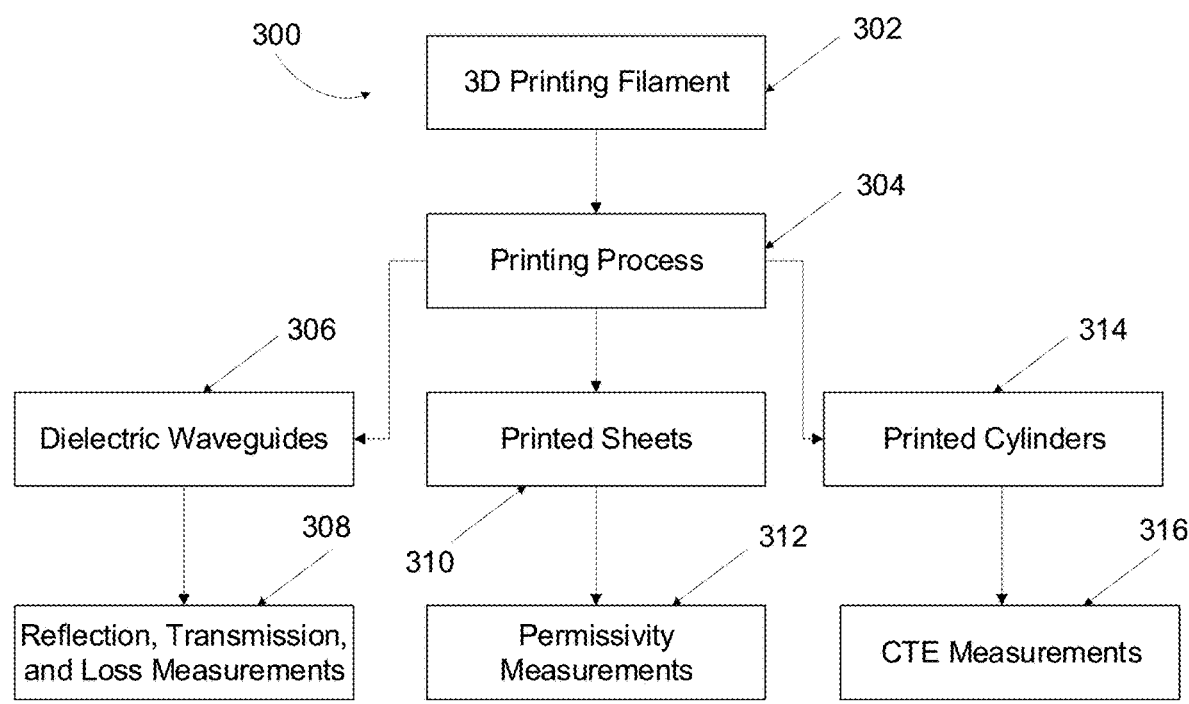
FIG. 17 is a flow diagram showing articles that can be printed using the composite filaments disclosed herein and further measurements that can be formed on each article to assess suitability for inclusion in RF and other devices.

FIG. 17 is a flow diagram showing a printing process 300 and articles that can be printed using the composite filaments disclosed herein and further measurements that can be formed on each article to assess suitability for inclusion in RF and other devices. 3D printing filament 302 is 3D printed into various articles including dielectric waveguides 306 that can be used to assess reflection, transmission, and loss 308 of the material; printed sheets 310 that can be used for permittivity measurements 312, and printed cylinders 314 that can be used to measure properties such as coefficient of thermal expansion 316. FIG. 14A shows cylinders 3D printed from exemplary composites as disclosed herein. FIGS. 14B-14C show, respectively, exemplary 3D printed DWGs and a DWG in experimental use.

Properties of the Composite Materials and Articles Formed Therefrom

The composite materials described herein possess numerous properties that make them useful in producing filaments for 3D printing. Not wishing to be bound by theory, the composite materials have decreased particle agglomeration. The composite materials exhibit an improved interface between the polymer matrix and the ceramic particles coated with the surfactant, thereby leading to improved dielectric properties. Furthermore, the composite materials possess reduced brittleness and a lower coefficient of thermal expansion while simultaneously having improved 3D printability. The composite materials permit increased operating temperatures, permissible humidity levels, and power range of printed devices and modules as well as reducing the risk of potential device failures.

In one aspect, the composite materials and/or articles 3D printed therefrom have a permittivity of from about 4.85 to about 12.01 when an electromagnetic signal having a frequency of from about 4 GHz to about 13.5 GHz is applied to the composite materials and/or 3D printed articles. In another aspect, the permittivity is about 4.85, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75 12 or about 12.01, or a combination of any of the foregoing values, or a range encompassing any of the foregoing values.

In one aspect, the composite materials and/or articles 3D printed therefrom have a loss tangent of from about 0.0015 to about 0.0035 when an electromagnetic signal having a frequency of from about 4 GHz to about 13.5 GHz is applied to the composite materials and/or 3D printed articles. In another aspect, the loss tangent is about 0.0015, 0.002, 0.0025, 0.003, or about 0.0035, or a combination of any of the foregoing values, or a range encompassing any of the foregoing values.

In one aspect, the composite materials and/or articles 3D printed therefrom have a dielectric constant of from about 5 to about 7.1 when an electromagnetic signal having a frequency of about 4 GHz to about 13.5 GHz is applied to the composite materials and/or 3D printed articles.

In another aspect, the dielectric constant is about 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12 or about 12.01 or a combination of any of the foregoing values, or a range encompassing any of the foregoing values.

In one aspect, the composite materials and/or articles 3D printed therefrom have a coefficient of thermal expansion of from about 28 ppm/° C. to about 75 ppm/° C., or of about 30 ppm/° C. to about 50 ppm/° C., or of about 40 ppm/° C. to about 50 ppm/° C., or of about 28, 30, 32, 34, 36, 38, 40, 42, 44, 46, 48, or about 50 ppm/° C., or a combination of any of the foregoing values, or a range encompassing any of the foregoing values.

In one aspect, the composite materials and/or articles 3D printed therefrom have a glass transition temperature (T) of from about 105° C. to about 125° C., or from about 110° C. to about 120° C., or of about 105, 106, 107, 108, 109, 110, 111, 112, 113, 114, 115, 116, 117, 118, 119, 120, 121, 122, 123, 124, or about 125° C., or a combination of any of the foregoing values, or a range encompassing any of the foregoing values. In one aspect, the $T_g$ is about 111° C.

In one aspect, the composite materials and/or articles 3D printed therefrom have an insertion loss of about 0.4 dB to about 0.5 dB at 17.23 GHz, or have an insertion loss of about 0.010 dB/mm to about 0.0105 dB/mm at 17.23 GHz. In one aspect, the composite materials and/or articles 3D printed therefrom have an insertion loss of about 0.46 dB at 17.23 GHz, or have an insertion loss of about 0.012 dB/mm at 17.23 GHz. The composite materials described herein exhibit very low dielectric loss, which makes them most suitable for 3D printing dielectric devices/systems such as, for example, dielectric waveguide or dielectric waveguide antennas, with low loss and great radiation (energy) efficiency.

In one aspect, the composite materials and/or articles 3D printed therefrom have transmission loss at 25° C. and 98% humidity of within about 20%, optionally within about 15%, or within about 10% of the transmission loss for the 3D printed article at 25° C. and room humidity at 17 GHz.

In one aspect, the composite materials and/or articles 3D printed therefrom have total loss at 25° C. and 98% humidity of within about 20%, optionally within about 15%, or within about 10% of the total loss for the 3D printed article at 25° C. and room humidity at 17 GHz.

Uses and Advantages of the Composite Materials and Articles Prepared Therefrom

In one aspect, a large difference in coefficient of thermal expansion (CTE) in manufactured composite materials is known to cause device failure, for example, in high power radio frequency (RF) and/or millimeter wave (mm-wave) devices. In one aspect, the disclosed composite materials have a lower CTE, reducing the likelihood of device failure over a wide range of operating temperatures and power inputs. In one aspect, for high power monolithic microwave integrated circuits (MMICs), the properties of the disclosed composite materials can be tailored to match the CTE of the MMIC chip in order to reduce device failure.

In another aspect, RF and mm-wave devices may experience failure in a humid environment. In one aspect, the composite materials disclosed herein include a hydrophobic surfactant. In a further aspect, the hydrophobicity of the surfactant can lead to better device performance and reduce device failure under conditions of high relative humidity.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

ASPECTS

The present disclosure can be described in accordance with the following numbered Aspects, which should not be confused with the claims.

Aspect 1. A composite material comprising a polymer matrix and ceramic particles dispersed throughout the polymer matrix, wherein the ceramic particles comprise a surfactant coating.

Aspect 2. The composite material of aspect 1, wherein the ceramic particles comprise $TiO_2Al_3Mg_3B_{56}$, $(AlN)_x \cdot (Al2O3)_{1-x}$, $BaTiO_3$, $BeO$, $Bi_2Sr_2Ca_{n-1}Cu_nO_{2n+4+x}$, $Bi_{12}TiO_{20}$, $Bi_4Ti_3O_{12}$, $Bi_2Ti_2O_7$, $BN$, $3CaO \cdot Al_2O_3$, $12CaO \cdot 7Al_2O_3$, $CaO \cdot Al_2O_3$, $CaO \cdot 2Al_2O_3$, $CaO \cdot 6Al_2O_3$, $CeB_6$, $Dy_2Ti_2O_7$, $GeO_2$, $HfB_2$, $Ga_5La_3O_{14}Si$, $LaB_6$, $La_{1-x}Sr_xMnO_3$, $LaYbO_3$, $Pb(Sc_xTa_{1-x})O_3$, $Pb(Zr_xTi_{1-x})O_3$, $MgB_2$, $MgO$, $MoSi_2$, $NbB_2$, $SiB_3$, $SiB_4$, $SiB_6$, $SiC$, $SiO_2$, $Si_3N_4$, $Si_2N_2O$, $Na_{0.5}Bi_{0.5}TiO_3$, $SrTiO_3$, $WSi_2$, $W_2N$, $WN$, $WN_2$, $YBa_2Cu_3O_7$, $ZnO$, $ZrO_2$, or a combination thereof.

Aspect 3. The composite material of aspect 2, wherein the ceramic particles comprise $TiO_2$ and $BaTiO_3$ in a 1:1 (v/v) ratio.

Aspect 4. The composite material of aspect 2, wherein the ceramic particles comprise $TiO_2$.

Aspect 4. The composite material of any of aspects 1-4, wherein the ceramic particles are present in an amount of from about 15 vol % to about 80 vol % of the composite material.

Aspect 5. The composite material of any of aspects 1-4 wherein the ceramic particles are present in an amount of from about 30 vol % to about 70 vol % of the composite material.

Aspect 6. The composite material of any of aspects 1-4 wherein the ceramic particles are present in an amount of from about 30 vol % to about 50 vol % of the composite material.

Aspect 7. The composite material of any of aspects 1-4 wherein the ceramic particles are present in an amount of about 30 vol % of the composite material.

Aspect 8. The composite of any one of aspects 1-7, wherein the ceramic particles have been calcined at a temperature of from about 800° C. to about 1,500° C. prior to coating the particles with the surfactant.

Aspect 9. The composite material of any of aspects 1-8, wherein the polymer matrix comprises cycloolefin copolymer (COP), high-density polyethylene, low-density polyethylene, polycarbonate, acrylic polymers and copolymers such as polymethyl methacrylate (PMMA) and ethylene-comethacrylic acid (EMAA), polyamide, polystyrene, polypropylene, acrylonitrile butadiene styrene (ABS), polyester, acetal copolymer polyoxymethylene, acetal homopolymer polyoxymethylene, polyvinyl chloride (PVC), polybenzimidazole, a thermoplastic polyurethane, ethylene vinyl alcohol, polyacetal, polyacrylonitrile, polyamide-imide, polyaryletherketone, polybutadiene, polybutylene, polydicyclopentadiene, polyketone, polyetheretherketone, polyetherimide, polyethersulfone, polyphenylene oxide, polyphenylene sulfide, polyphthalamide, polysulfone, polyvinylidene chloride, or a combination thereof.

Aspect 10. The composite material of any of aspects 1-9, wherein the surfactant is present in an amount of from about 0.1 mL to about 1 mL per 10 g of ceramic particles.

Aspect 11. The composite material of any of aspects 1-10, wherein the surfactant comprises an aminosilane having the formula

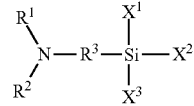

where $R^1$ and $R^2$ are independently, an alkyl group or hydrogen; $R^3$ is an alkylene group; and $X^1$, $X^2$, and $X^3$ are, independently, $R^4$, $R^5$, R, $OR^4$, $OR^5$, OR, where $R^4$, $R^5$, and $R^6$ are hydrogen or an alkyl group, preferably γ-aminopropyltriethoxysilane, γ-aminopropyldiethoxymethylsilane, γ-aminopropyldimethylethoxysilane, γ-aminopropyltrimethoxysilane, γ-aminopropyltriethoxysilane, γ-aminopropyldiethoxymethylsilane, γ-aminopropyldimethylethoxysilane, or γ-aminopropyltrimethoxysilane, or a combination thereof.

Aspect 12. The composite material of any of aspects 1-11, further comprising at least one additive.

Aspect 13. The composite material of aspect 12, wherein the at least one additive comprises a maleic anhydride grafted polypropylene wax.

Aspect 14. The composite material of aspect 12 or 13, wherein the additive is present in an amount of about 5 vol % of the composite material.

Aspect 15. The composite material of any of aspects 1-14, wherein the ceramic particles comprise $TiO_2$ in an amount of from about 30 vol %, the polymer matrix comprises cycloolefin copolymer, the surfactant comprises γ-aminopropyltriethoxysilane, and the additive comprises a maleic anhydride grafted polypropylene wax in an amount of about 5 vol % of the composite material.

Aspect 16. The composite material of any of aspects 1-15, wherein the composite material has an average surface roughness of about 10 μm or less.

Aspect 17. The composite material of any of aspects 1-15, wherein the composite material has an average surface roughness of about 5 μm or less.

Aspect 18. The composite material of any of aspects 1-15, wherein the composite material has an average surface roughness of about 1 μm or less.

Aspect 19. The composite material of any of aspects 1-18, wherein the composite material has a permittivity of from about 4.85 to about 12.01 when an electromagnetic signal comprising a frequency of from about 4 GHz to about 13.5 GHz is applied to the composite material.

Aspect 20. The composite material of any of aspects 1-19, wherein the composite material has a loss tangent of from about 0.0015 to about 0.0035, when an electromagnetic signal comprising a frequency of from about 4 GHz to about 13.5 GHz is applied to the composite material.

Aspect 21. The composite material of any of aspects 1-20, wherein the composite material has a dielectric constant of from about 5 to about 12.01 when an electromagnetic signal comprising a frequency of from about 4 GHz to about 13.5 GHz is applied to the composite material.

Aspect 22. The composite material of any of aspects 1-21, wherein the composite material has a coefficient of thermal expansion (CTE) of from about 28 ppm/° C. to about 75 ppm/° C. from a temperature of about 40° C. to a temperature of about 120° C.

Aspect 23. The composite material of any of aspects 1-22, wherein the composite material has a coefficient of thermal expansion (CTE) of from about 30 ppm/° C. to about 50 ppm/° C. from a temperature of about 40° C. to a temperature of about 120° C.

Aspect 24. The composite material of any of aspects 1-23, wherein the composite material has a coefficient of thermal expansion (CTE) of from about 40 ppm/° C. to about 50 ppm/° C. from a temperature of about 40° C. to about 120° C.

Aspect 25. The composite material of any of aspects 1-24, wherein the composite material has a glass transition temperature of from about 105° C. to about 150° C.

Aspect 26. The composite material of any of aspects 1-24, wherein the composite material has a glass transition temperature of from about 110° C. to about 150° C.

Aspect 27. The composite material of any of aspects 1-24, wherein the composite material has a glass transition temperature of about 111° C.

Aspect 28. The composite material of any of aspects 1-27, wherein the composite material has a insertion loss of about 0.4 dB to about 0.5 dB at 17.23 GHz.

Aspect 29. The composite material of any of aspects 1-27, wherein the composite material has a insertion loss of about 0.010 dB/mm to about 0.015 dB/mm at 17.23 GHz.

Aspect 30. The composite material of any of aspects 1-27, wherein transmission loss for the composite material at 25° C. and 98% relative humidity is within 20% of the transmission loss for the composite material at 25° C. and room humidity at 17 GHz.

Aspect 31. The composite material of any of aspects 1-30, wherein total loss for the composite material at 25° C. and 98% relative humidity is within 20% of the total loss for the composite material at 25° C. and room humidity at 17 GHz.

Aspect 32: A composite material produced by the process comprising:
 a. calcining a ceramic material to obtain a calcined material;
 b. admixing the calcined material with a composition comprising a first solvent and a surfactant to produce a first admixture;
 c. drying the first admixture to obtain a first coated particle composition having a first average particle diameter;
 d. sieving the first coated particle composition to obtain a second coated particle composition having a second average particle diameter, wherein the second average particle diameter is less than the first average particle diameter;
 e. admixing the second coated particle composition in a composition comprising a polymer matrix in a second solvent to form a third admixture; and
 f. drying the third admixture to produce the composite material.

Aspect 33. The composite material of aspect 32, wherein the ceramic material comprises $TiO_2Al_3Mg_3B_{56}$, $(AlN)_x \cdot (Al2O_3)_{1-x}$, $BaTiO_3$, $BeO$, $Bi_2Sr_2Ca_{n-1}Cu_nO_{2n+4+x}$, $Bi_{12}TiO_{20}$, $Bi_4Ti_3O_{12}$, $Bi_2Ti_2O_7$, BN, $3CaO \cdot Al_2O_3$, $12CaO \cdot 7Al_2O_3$, $CaO \cdot Al_2O_3$, $CaO \cdot 2Al_2O_3$, $CaO \cdot 6Al_2O_3$, $CeB_6$, $Dy_2Ti_2O_7$, $GeO_2$, $HfB_2$, $Ga_5La_3O_{14}Si$, $LaB_6$, $La_{1-x}Sr_xMnO_3$, $LaYbO_3$, $Pb(Sc_xTa_{1-x})O_3$, $Pb(Zr_xTi_{1-x})O_3$, $MgB_2$, MgO, $MoSi_2$, $NbB_2$, $SiB_3$, $SiB_4$, $SiB_6$, SiC, $SiO_2$, $Si_3N_4$, $Si_2N_2O$, $Na_{0.5}Bi_{0.5}TiO_3$, $SrTiO_3$, $WSi_2$, $W_2N$, WN, $WN_2$, $YBa_2Cu_3O_7$, ZnO, $ZrO_2$, or a combination thereof.

Aspect 34. The composite material of aspect 32 or 33, wherein the ceramic material is present in an amount of from about 15 vol % to about 80 vol % of the composite material.

Aspect 35. The composite material of any of aspects 32-34 wherein the ceramic material is calcined at temperature of about 800° C. to about 1,500° C.

Aspect 36. The composite material of any of aspects 32-35 wherein the ceramic material is calcined for about 0.5 hours to about 12 hours.

Aspect 37. The composite material of any of aspects 32-36, wherein the first solvent comprises ethanol, methanol, acetone, 1-propanol, allyl alcohol, isopropanol, n-butanol, isobutanol, sec-butanol, tert-butanol, 1-pentanol, isoamyl alcohol, 2-methyl-1-butanol, neopentyl alcohol, 2-pentanol, 3-methyl-2-butanol, 3-pentanol, tert-amyl alcohol, or a combination thereof.

Aspect 38. The composite material of any of aspects 32-37, wherein the surfactant comprises γ-aminopropyltriethoxysilane, γ-aminopropyldiethoxymethylsilane, γ-aminopropyldimethylethoxysilane, γ-aminopropyltrimethoxysilane, or a combination thereof.

Aspect 39. The composite material of any of aspects 32-38, wherein step (b) is performed in a ball mill.

Aspect 40. The composite material of any of aspects 32-39, wherein step (b) is conducted at from about 1 hour to about 24 hours.

Aspect 41. The composite material of any of aspects 32-40, wherein the first admixture is dried at about 50° C. to about 100° C.

Aspect 42. The composite material of any of aspects 32-40, wherein the first admixture is dried overnight at about 25° C.

Aspect 43. The composite material of any of aspects 32-42, wherein the first coated particle composition is sieved using a 400 mesh sieve.

Aspect 44. The composite material of any of aspects 32-43, wherein the second coated particle composition has a second average particle diameter of less than or equal to 40 µm.

Aspect 45. The composite material of any of aspects 32-44, wherein the polymer matrix comprises cycloolefin polymer.

Aspect 46. The composite material of any of aspects 32-45, wherein the second solvent comprises cyclohexane.

Aspect 47. The composite material of any of aspects 32-46, wherein the second coated particle composition and the second admixture are admixed at about 1,000 rpm to about 3,000 rpm for about 0.5 minutes to about 60 minutes.

Aspect 48. The composite material of any of aspects 32-47, wherein drying the third admixture comprises drying the third admixture in a fume hood, baking the third admixture in an oven, or a combination thereof.

Aspect 49. A filament comprising the composite material of any of aspects 1-48.

Aspect 50. A filament produced by the process comprising:
a. chopping the composite material of any of aspects 1-48; and
b. extruding the composite material to produce the filament.

Aspect 51. The filament of aspect 50, further comprising admixing an additive with the composite material prior to or during extruding the composite material.

Aspect 52. The filament of aspect 51, wherein the additive comprises a maleic anhydride grafted polypropylene wax.

Aspect 53. The filament of aspect 51 or 52, wherein the additive comprises 10% or less of the overall filament volume.

Aspect 54. The filament of any of aspects 50-53 wherein the filament has a diameter of about 1.7 mm±0.15 mm.

Aspect 55. The filament of any of aspects 50-53, wherein the filament has a diameter of about 3 mm±0.15 mm.

Aspect 56. An article comprising the filament of any of aspects 50-55.

Aspect 57: The article of aspect 56, wherein the article is produced by a 3D printer.

Aspect 58. The article of aspect 56 or 57, wherein the article comprises a cylinder, a dielectric wave guide, a sheet, or another three-dimensional article.

Aspect 59. The article of aspect 56 or 57, wherein the article comprises a dielectric wave guide, a $K_u$ band antenna, a power splitter, a feeding structure for dielectric antenna arrays, a phase shifter, a dielectric lens antenna, a chip-to-chip interconnect, or another radio frequency device.

REFERENCES

1. Castro, J. et al., "Fabrication, Modeling, and Application of Ceramic-Thermoplastic Composites for Fused Deposition Modeling of Microwave Components," IEEE Transaction. on Microwave Theory and Techniques, 65:2073-2084, 2017.

2. Vo, H. T. et al., "Towards model-based engineering of optoelectronic packaging materials: dielectric constant modeling," Elsevier Microelectronics Journal, 33:409-415, 2002.

3. Todd, M. G. et al., "Complex Permittivity of Composite Systems: A Comprehensive Interphase Approach," IEEE Transactions on Dielectrics and Electrical Insulation, 12:601-611, 2005.

4. Castles, F. et al., "Microwave dielectric characterization of 3D-printed $BaTi_3$/ABS polymer composites," Scientific Reports, 6, Article No. 22714, 2016.

5. Zhang, S. et al., "3D-printed planar graded index lenses," IET Microwave Antennas Propagation, 10:1411-1419, 2016.

6. Ding, T. et al., "3D field-shaping lens using all dielectric gradient refractive index materials," Scientific Reports, 7, Article No. 782, 2017.

7. Lugo, D. C. et al., "3D printed multilayer mm-wave dielectric rod antenna with enhanced gain," 2017 IEEE International Symposium on Antennas and Propagation & USNC/URSI National Radio Science Meeting, San Diego, CA, pp. 1247-1248, 2017.

8. Ramirez, R. A. et al., "MMIC packaging and on-chip low-loss lateral interconnection using additive manufacturing and laser machining," 2017 IEEE MTT-S International Microwave Symposium (IMS), Honolulu, HI, pp. 38-40, 2017.

9. Wu, Y. et al., "Fabrication of Composite Filaments with High Dielectric Permittivity for Fused Deposition 3D Printing," MDPI Materials 2017, 10, No. 1218, 2017.

10. Barber, P. et al., "Polymer Composite and Nanocomposite Dielectric Materials for Pulse Power Energy Storage" MDPI Materials, 2:1697-1733, October 2009.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Manufacturing Methodology

D-100 $TiO_2$ powders were calcined at 1100° C. for 2 h to crystallize and improve dielectric properties. Calcined powders were then ball milled for 18 h in ethanol media (solution) in the presence of γ-aminopropyltriethoxysilane (APTES) surfactant. A 4:1 ball:powder ratio was used along with a ball milling speed of 600 rpm in a high energy planetary ball mill (canister size).

Ball-milled powders were dried at 60° C. to remove ethanol. Dried powder was sieved using a 400 mesh sieve to remove particles larger than 40 µm. Thermoplastic cycloolefin polymer (COP, ZEONEX®, Zeon, Tokyo, Japan) was dissolved in cyclohexane for 24 h to produce a dissolved solution with a medium viscosity.

Sieved powders and dissolved COP were mixed using a planetary centrifugal bubble-free mixer (Thinky USA, Laguna Hills, CA) at 2000 rpm for 10 min. The mixed solution was dried in a fume hood overnight and baked at 80° C. to remove remaining solvent. Dried composites were manually chopped and fed to a Filabot EX-2 melt extruder (Filabot, Barre, VT) to fabricate a feedstock filament suitable for 3D fused deposition modeling (FDM) printer. In some experiments the filament was 1.7 mm in diameter.

Example 2: Properties of the Composites

Permittivity Values

Figure 1B:
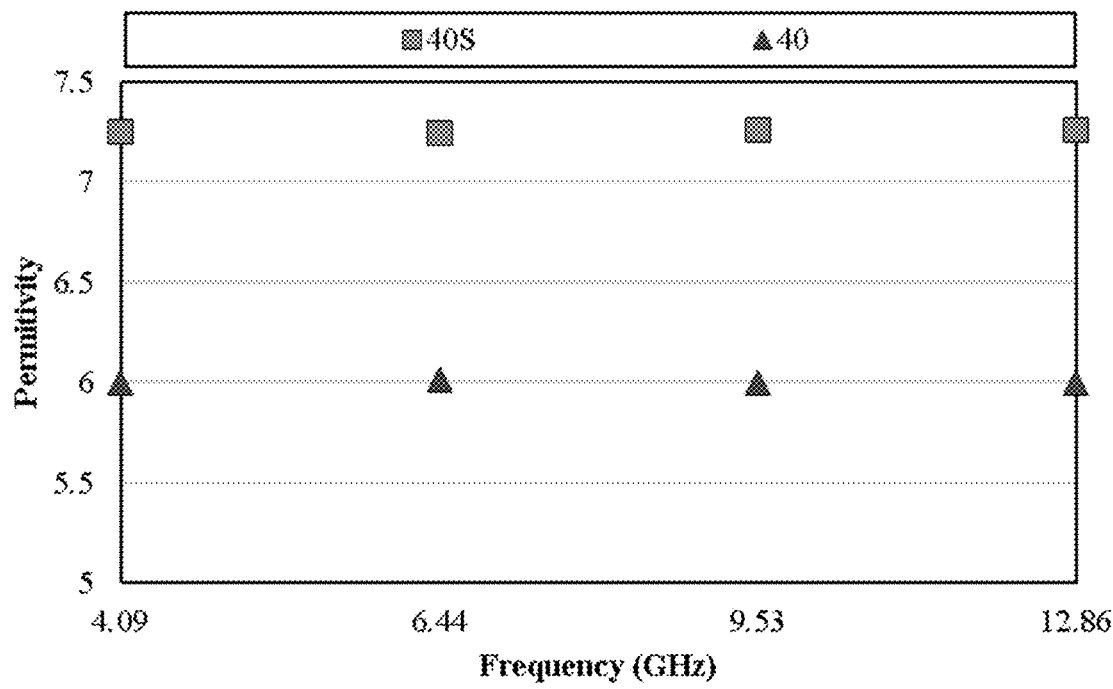

Measured permittivity values for exemplary prepared composites with 30 wt % and 40 wt % $TiO_2$ versus frequency are shown in FIGS. 1A and 1B, respectively, demonstrating that surface modification of ceramic particles increases permittivity of composite. Surface modified samples 30S and 40S are represented by blue squares, while non-modified samples 30 and 40 are represented by red triangles. Numbers in sample identifiers indicate amount of $TiO_2$ used.

Figure 3:
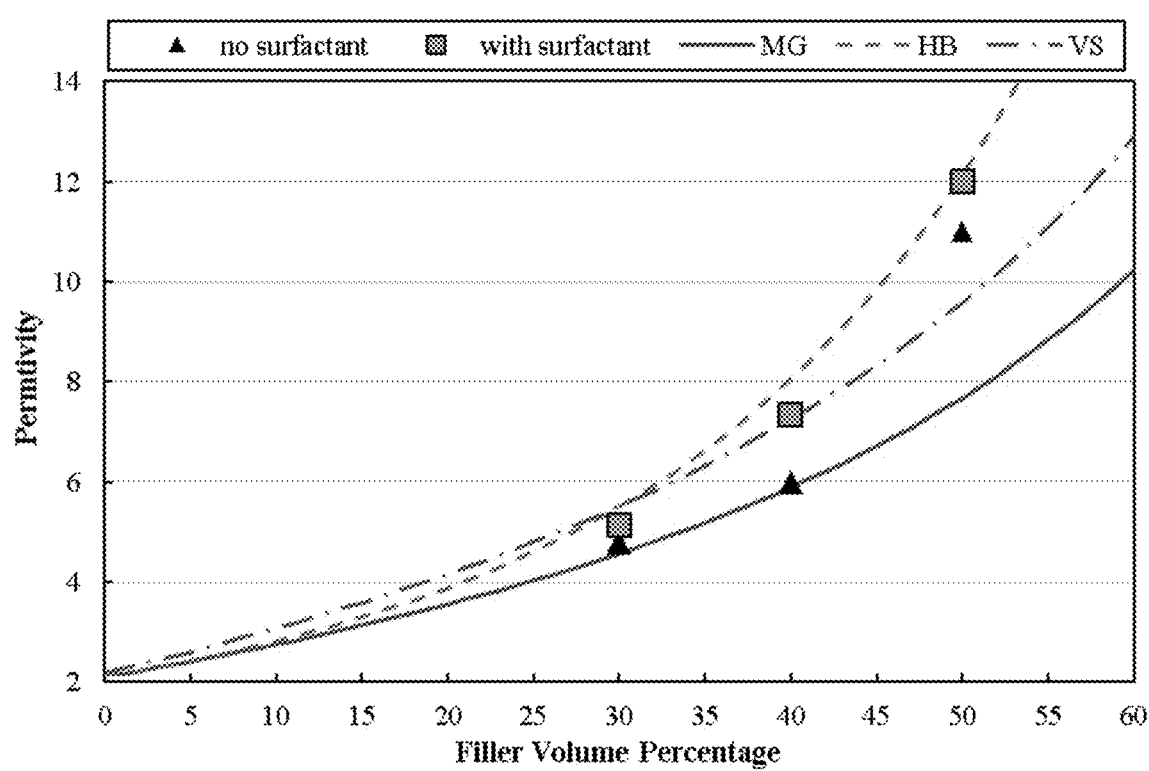
FIG. 3 shows the measured permittivity values of composites with and without surfactant treatment are compared with three different model predictions: Maxwell Garnet (MG), Hani-Buggeman (HB), and Vo Shi (VS), indicating the dependence of permittivity on volume concentration of fillers. It is observed that the new surface treatment consistently increases measured permittivity values under different volume fractions of loaded ceramic fillers.

FIG. 3 shows the measured permittivity values of composites with and without surfactant treatment are compared with three different model predictions: Maxwell Garnet (MG), Hani-Buggeman (HB), and Vo Shi (VS), indicating the dependence of permittivity on volume concentration of fillers. It is observed that the new surface treatment consistently increases measured permittivity values under different volume fractions of loaded ceramic fillers.

Loss Tangents

Figure 2A:
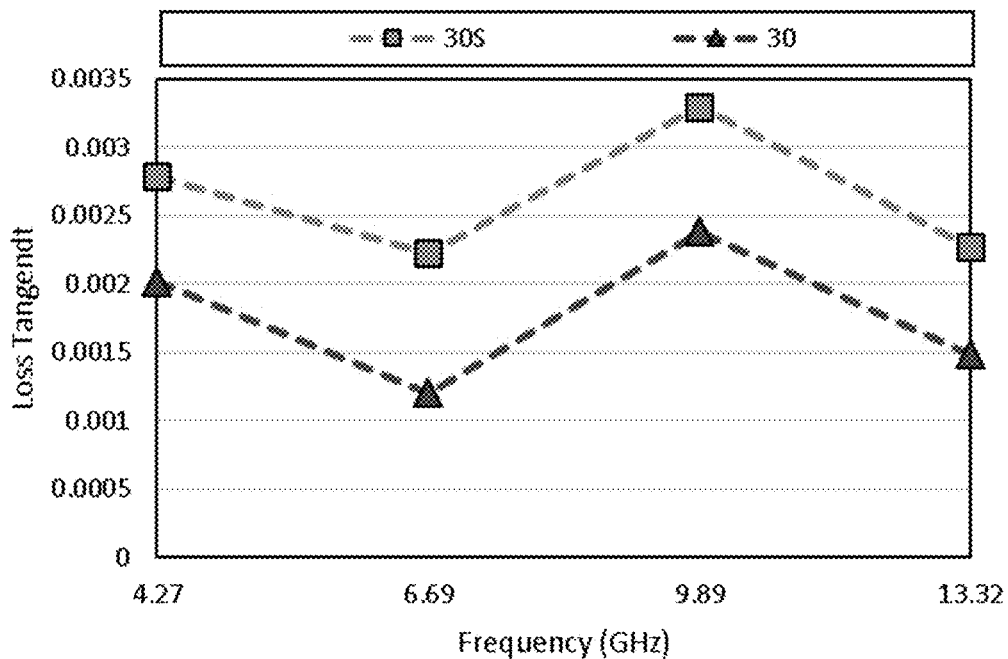
FIGS. 2A-2B are comparisons measured loss tangents vs. frequency of exemplary prepared composites 30 and 30S (FIG. 2A) and 40 and 40S (FIG. 2B), showing that the measured losses do not show a dependency on the surface treatment. Surface modified samples 30S and 40S are represented by blue squares, while non-modified samples 30 and 40 are represented by red triangles.
Figure 2B:
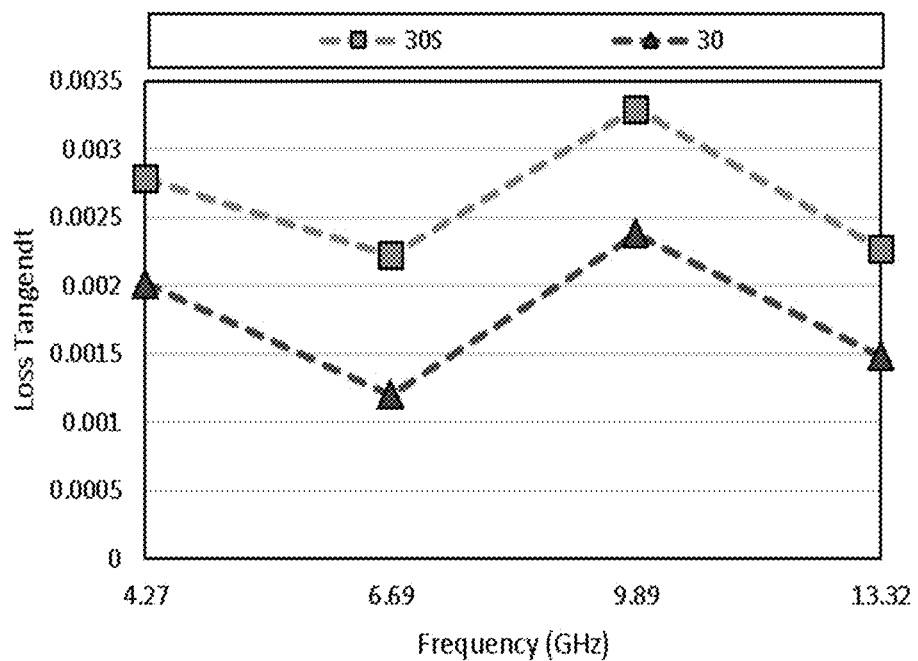

Measured loss tangents vs. frequency of exemplary prepared composites 30 and 30S and of composites 40 and 40S are shown in FIGS. 2A and 2B, respectively, demonstrating that the measured losses do not show a dependency on the surface treatment. Surface modified samples 30S and 40S are represented by blue squares, while non-modified samples 30 and 40 are represented by red triangles. Numbers in sample identifiers indicate amount of $TiO_2$ used.

Effect of Additive on Dielectric Properties

Figure 4A:
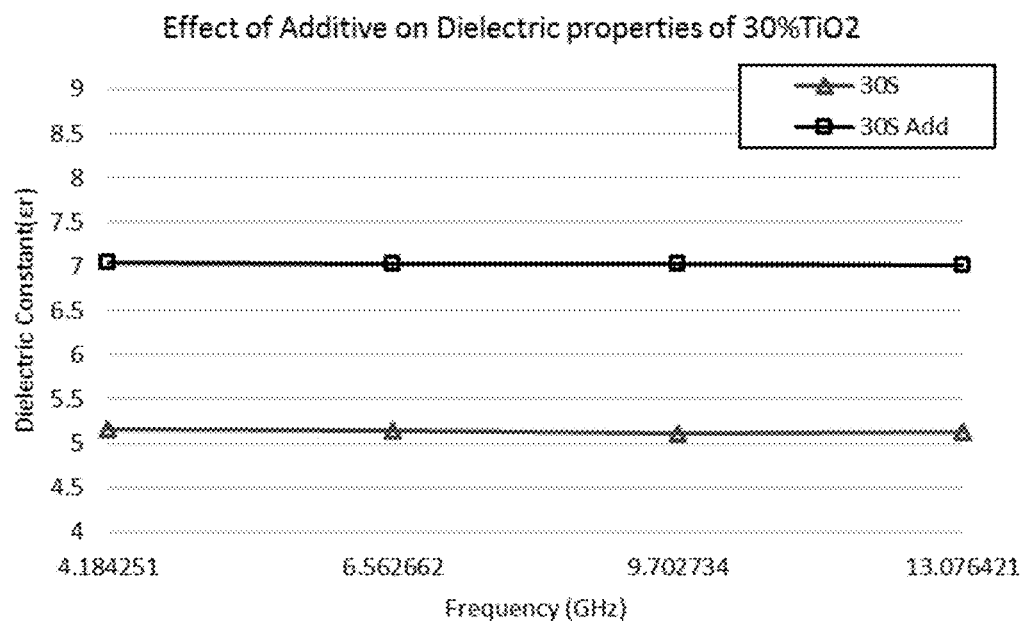
FIGS. 4A-4B show the effect of additive on dielectric properties, indicating that additive does not decrease the permittivity of the end composite (FIG. 4A) but rather increases it, while also decreasing the loss tangent of the composite filament (FIG. 4B). 30S is composite with no additive during extrusion process. In these examples, for composite 30S, the additive used during the extrusion process was Licocene PP MA 7452 at 5 wt %.
Figure 4B:
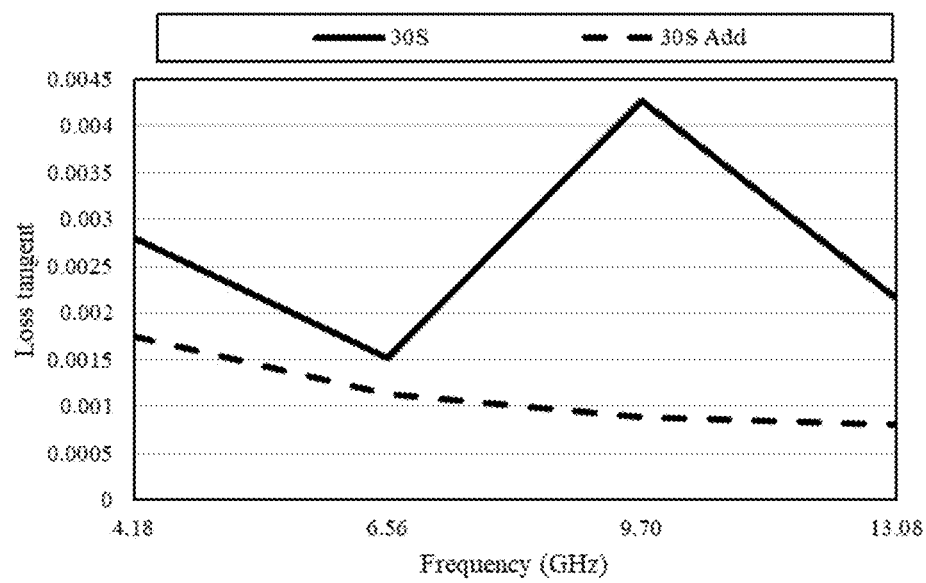

FIGS. 4A-4B show the effect of additive on dielectric properties, demonstrating that additive does not decrease the permittivity of end composite but rather increases it (FIG. 4A), while also decreasing the loss tangent of the composite filament (FIG. 4B). 30S is composite with no additive during extrusion process. In these examples, for composite 30S, the additive used during the extrusion process was Licocene PP MA 7452 (Clariant, Muttenz, Switzerland) at 5 wt %.

Effect of Ceramic Filler Volume

Figure 5:
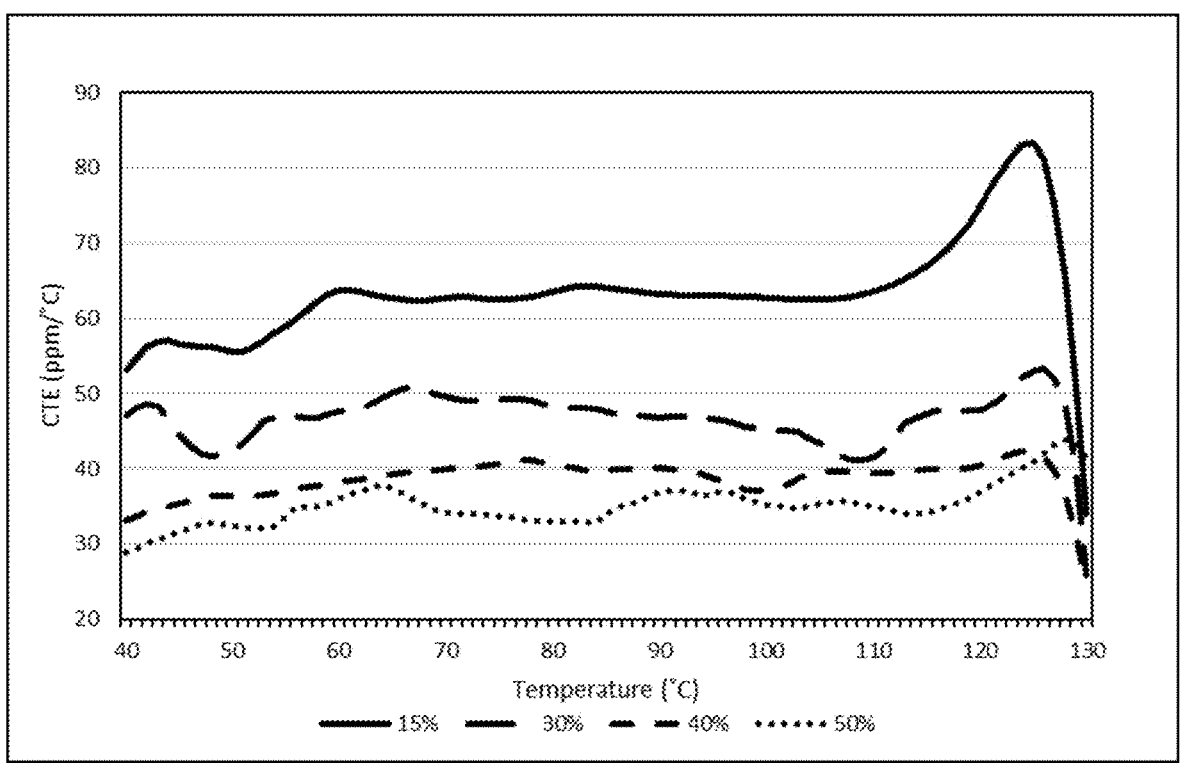
FIG. 5 shows the effect of $TiO_2$ filler volume on average coefficient of thermal expansion (CTE) values. CTE measurements were collected using a TA Instruments Q400 thermomechanical analyzer (TMA) tool.

FIG. 5 shows the effect of $TiO_2$ filler volume on average coefficient of thermal expansion (CTE) values. CTE was measured using 3D printed cylindrical samples using a Thermo-Mechanical Analyzer Q400 (TA Instruments, New Castle, Delaware). An increase in ceramic filler volume was found to decrease the average CTE of the composites.

Figure 6:
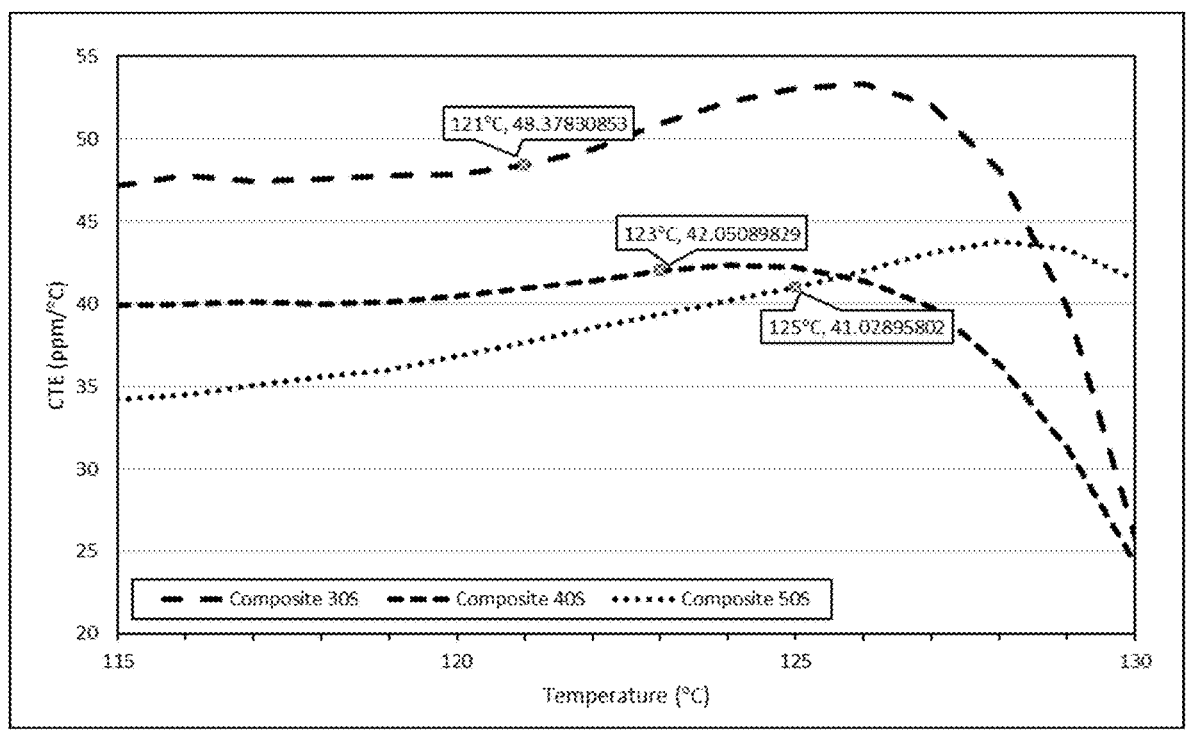
FIG. 6 shows the effect of $TiO_2$ filler volume on average glass transition temperatures ($T_g$).

FIG. 6 shows the effect of $TiO_2$ filler volume on average glass transition temperatures (T). $T_9$ was measured using 3D printed cylindrical samples on a Thermo-Mechanical Analyzer Q400 from TA Instruments. The starting temperature for measurements was room temperature (25° C.), with a ramp of 1° C./min and an end temperature of 145° C. A comparison of $TiO_2$ volume fraction and $T_9$ values is presented in Table 1:

TABLE 1

Effect of Filler Volume on Glass Transition Temperature

| $TiO_2$ Volume Fraction | $T_g$ (° C.) |
| --- | --- |
| 15 | 109 |
| 30 | 121 |
| 40 | 123 |
| 50 | 125 |

Effect of Surfactant Volume Concentration

Figure 7A:
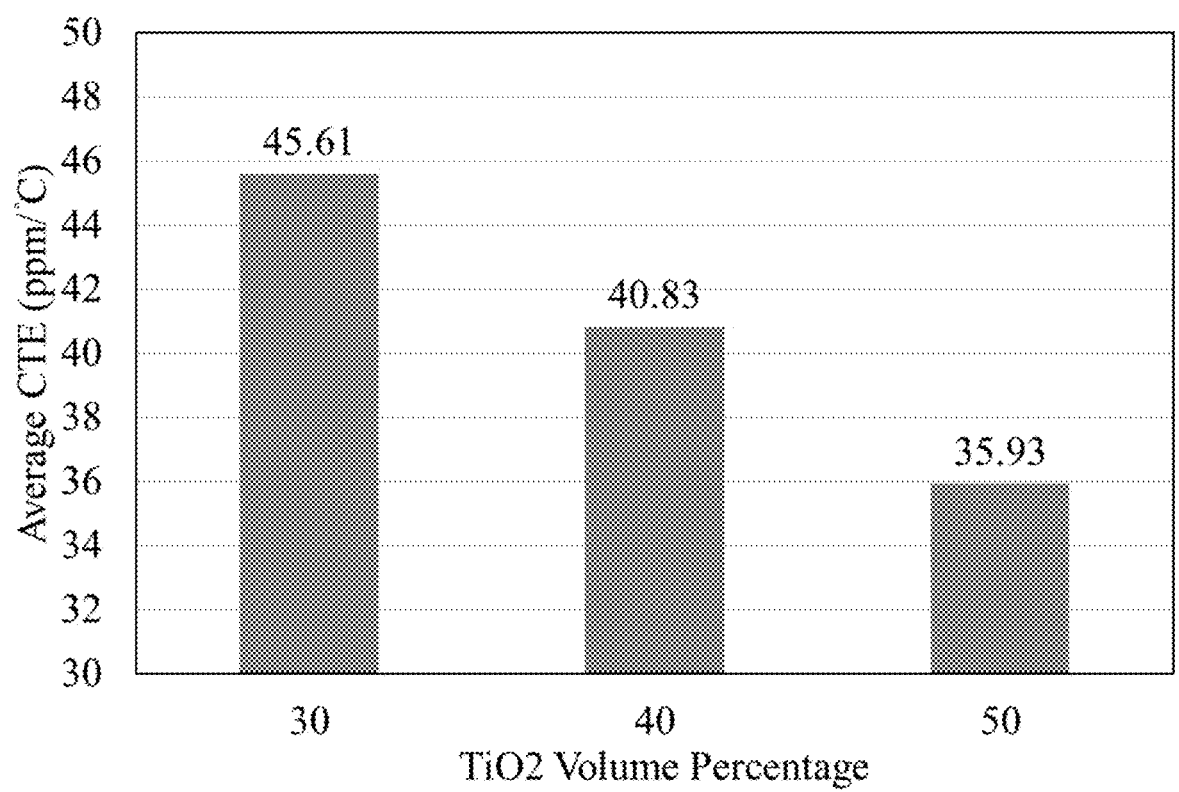
FIG. 7A shows average CTE values composites containing 30, 40, and 50 vol % $TiO_2$.
Figure 7B:
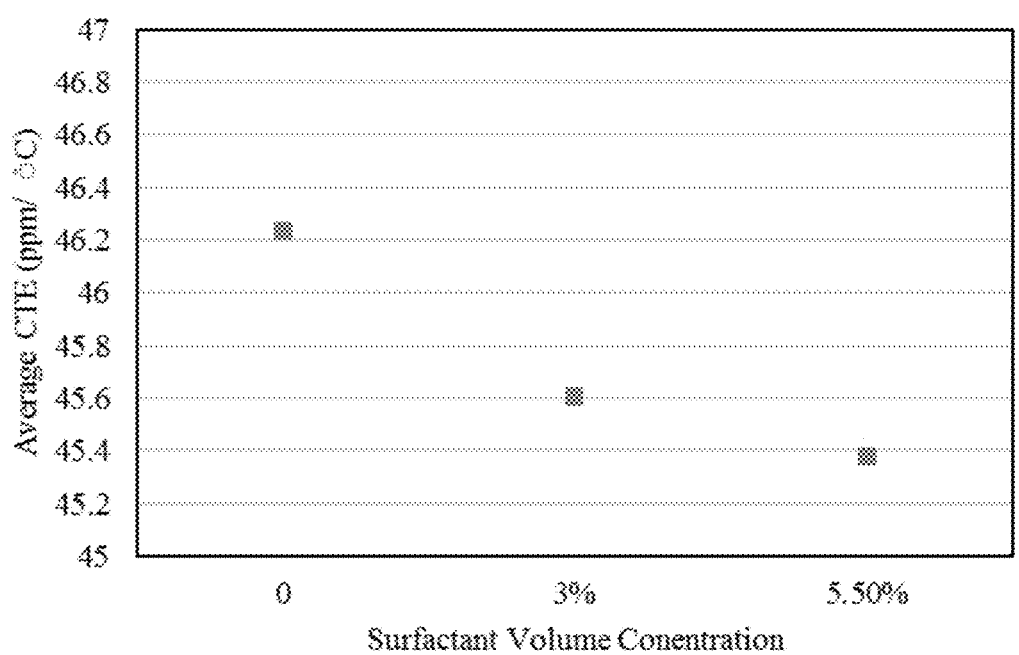
FIG. 7B shows the CTE for exemplary 30 vol % $TiO_2$-COP composites containing varied amounts of surfactant (in vol %) that were incorporated during surfactant assisted ball milling (SABM). Increasing surfactant content decreases CTE of manufactured composites, confirming that the SABM process effectively applies the surfactant on particles.

FIG. 7A shows average CTE values composites containing 30, 40, and 50 vol % $TiO_2$. FIG. 7B shows the CTE for exemplary 30 vol % $TiO_2$—COP composites containing varied amounts of surfactant (in vol %) that were incorporated during surfactant assisted ball milling (SABM). Amounts used included 0 mL, 0.1 mL, and 1 mL surfactant per 10 g of $TiO_2$. Increasing surfactant content decreases CTE of manufactured composites, confirming that the SABM process effectively applies the surfactant on particles.

Example 3: 3D Printed Specimens and Properties 3D printing was accomplished using an nScrypt Tabletop 3Dn printer (nScrypt, Orlando, Florida). Samples were printed using filaments including the disclosed composites and a commercially available premixed filament for comparative purposes.

Surface Roughness

Figure 8:
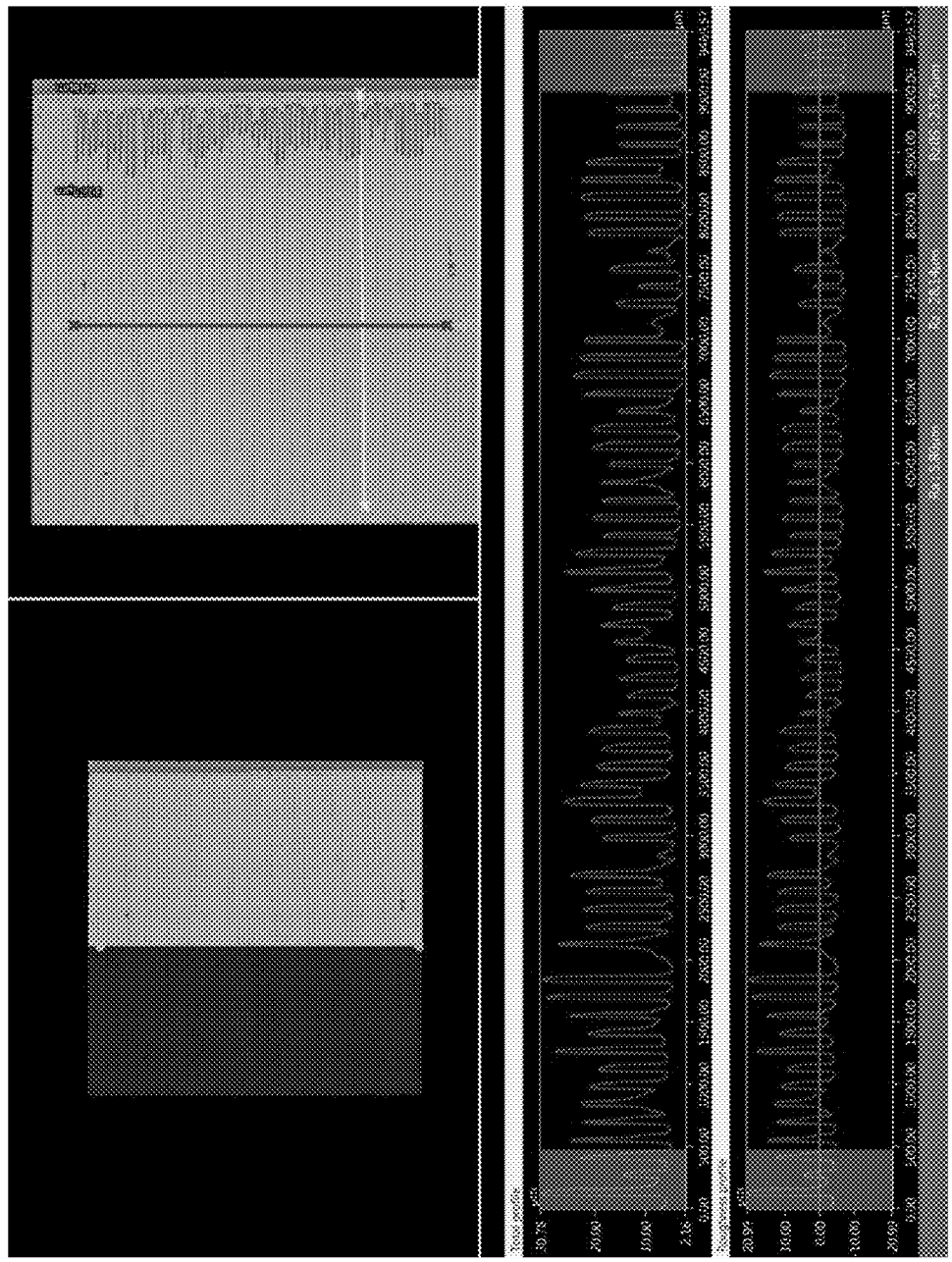
FIG. 8 shows measured roughness of 3D printed specimens of an exemplary composite having 50 vol % $TiO_2$. At radio frequency (RF) and millimeter-wave frequencies, the surface roughness of the printed devices has a great impact on the device performance due to smaller wavelengths of electromagnetic waves at higher frequencies. To ensure the printed specimens can achieve acceptable surface smoothness, the surface profile of printed composite was characterized using a Keyence optical microscope. An average surface roughness in range of 5-10 μm has been achieved.

FIG. 8 shows measured roughness of 3D printed specimens of an exemplary composite having 50 vol % $TiO_2$. At radio frequency (RF) and millimeter-wave frequencies, the surface roughness of the printed devices has a great impact on the device performance due to smaller wavelengths of electromagnetic waves at higher frequencies. To ensure the printed specimens can achieve acceptable surface smoothness, the surface profile of printed composite was characterized using a Keyence optical microscope. An average surface roughness in range of 5-10 μm has been achieved.

Performance Comparisons

Figure 9:
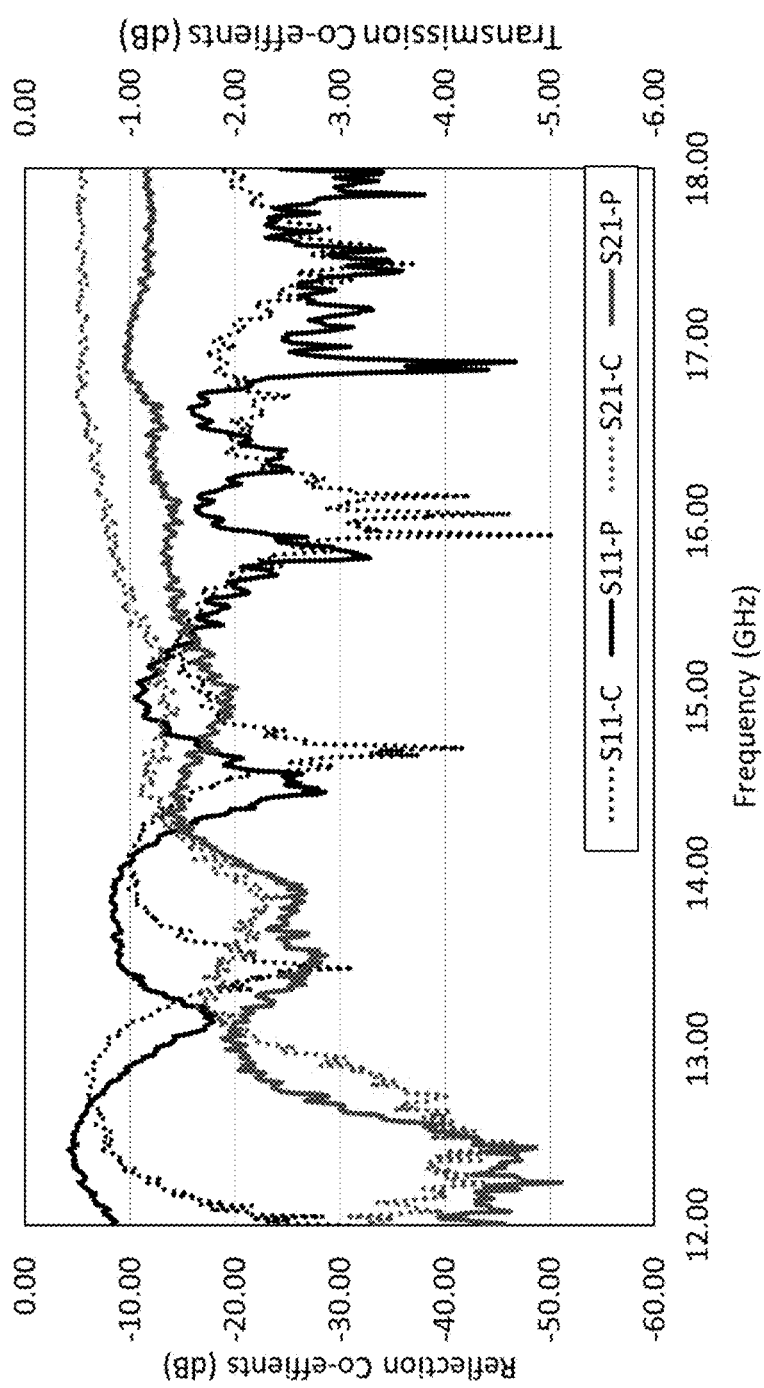
FIG. 9 shows performance comparisons of an exemplary composite of the present disclosure containing 30 vol % $TiO_2$ and a premixed commercial acrylonitrile butadiene styrene (ABS). Dielectric wave guides (DWG) were 3D printed with the exemplary composite and with the ABS and evaluated. S11-C represents reflection loss for the exemplary composite, S11-P represents reflection loss for the premixed ABS, S21-C represents transmission loss for the exemplary composite, and S21-P represents transmission loss for the premixed ABS.

FIG. 9 shows performance comparisons of an exemplary composite of the present disclosure containing 30 vol % $TiO_2$ and a premixed commercial acrylonitrile butadiene styrene (ABS). Dielectric wave guides (DWG) were 3D printed with the exemplary composite and with the ABS and evaluated. Printing was accomplished using an nFD™ device coupled to an nScrypt Tabletop 3Dn printer (nScrypt, Orlando, Florida). End tapers were removed following printing, leaving DWGs with a length of 40 mm.

A Keysight ENA E5063A network analyzer (100 kHz-18 GHz) (Keysight Technologies, Santa Rosa, California) was used for s-parameter measurements. WR-62 rectangular waveguides from Maury Microwave (Ontario, California) were used as an intermediate transmission line between ENA ports (SMA) and DWG. SSLT calibration was performed on waveguide ports and then WR-62 extenders were added to keep the calibration planes largely unaffected by the tapered sections of the DWG. S11-C represents reflection loss for the exemplary composite, S11-P represents reflection loss for the premixed ABS, S21-C represents transmission loss for the exemplary composite, and S21-P represents transmission loss for the premixed ABS. DWGs produced from the disclosed composite exhibit relatively lower loss at high frequencies due to the low loss tangent of these materials compared to commercially available products.

Figure 10:
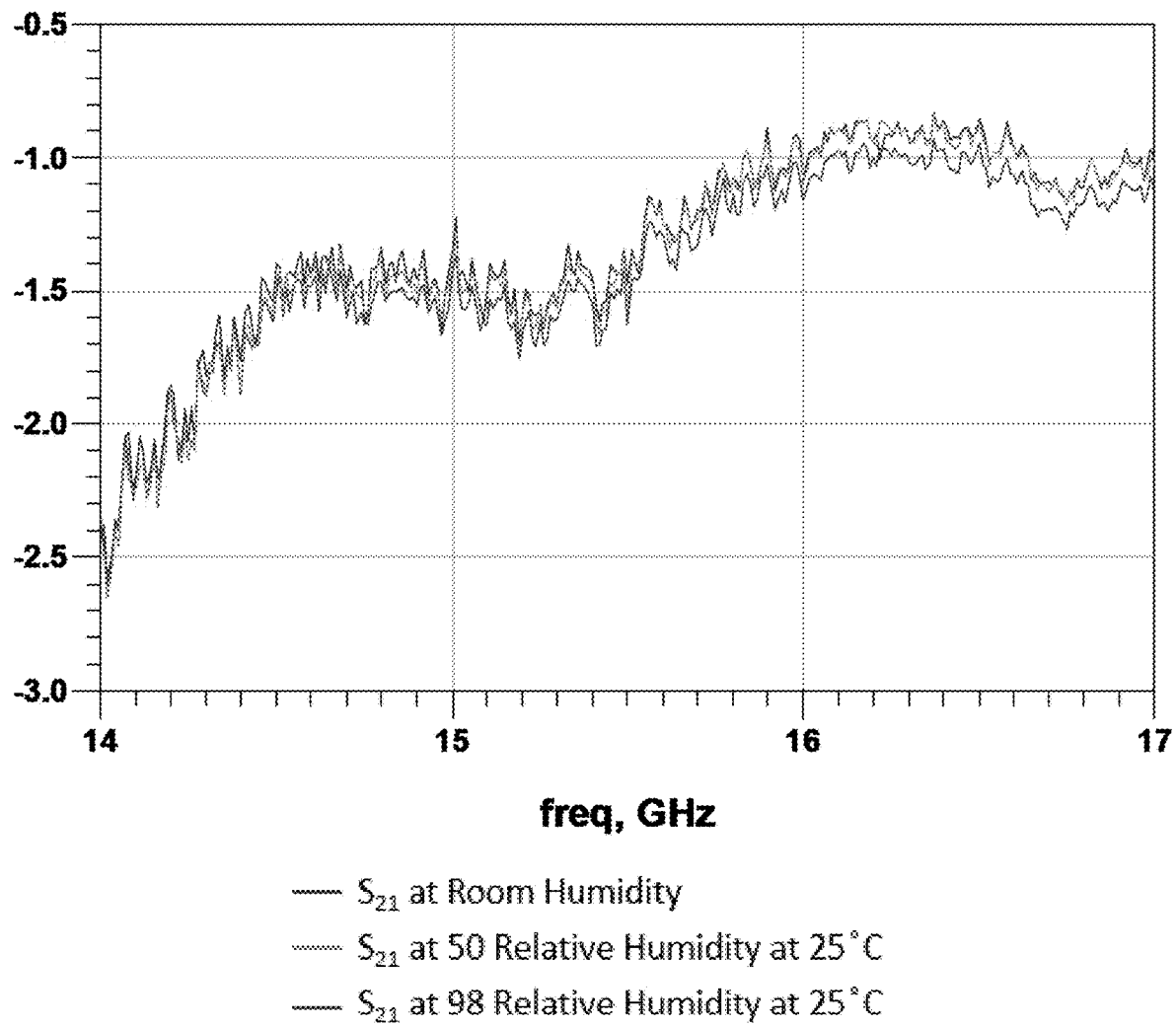
FIG. 10 shows transmission loss for a 3D printed DWG from the exemplary composites at room humidity (black), 50% relative humidity at 25° C. (orange), and 98% relative humidity at 25° C. (red).

A DWG printed from composite material 30 showed minimum insertion loss of 0.46 dB at 17.23 GHz compared to minimum insertion loss of 0.95 dB at 16.88 GHz for a DWG made of a commercial premixed ABS product. Additionally, the composite DWG showed measured insertion loss of 0.012 dB/mm at 17.23 GHz compared to 0.024 dB/mm at 16.88 GHz for the ABS DWG. Comparisons with additional commercial materials are presented in Table 2:

FIG. 10 shows transmission loss for a 3D printed DWG from the exemplary composites at room humidity (black), 50% relative humidity at 25° C. (orange), and 98% relative humidity at 25° C. (red).

Figure 11:
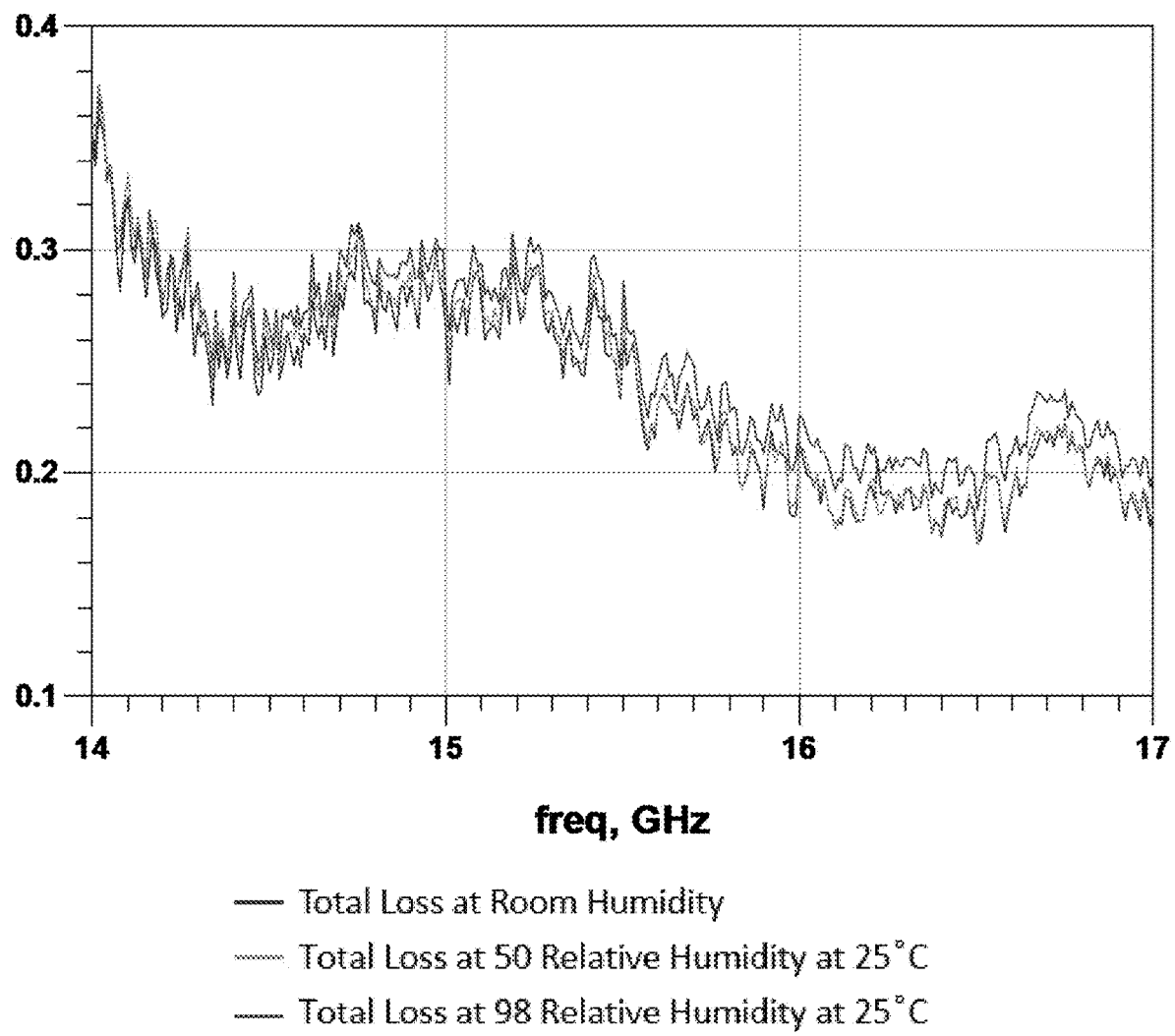
FIG. 11 shows total loss for a 3D printed DWG from the exemplary composites at room humidity (black), 50% relative humidity at 25° C. (orange), and 98% relative humidity at 25° C. (red), where total loss is calculated as $1-|det\ S|=1-|(S_{11}S_{22})-(S_{21}S_{12})|$.

FIG. 11 shows total loss for a 3D printed DWG from the exemplary composites at room humidity (black), 50% relative humidity at 25° C. (orange), and 98% relative humidity at 25° C. (red), where total loss is calculated as $1-|det\ S|=1-|(S_{11}-S_{22})-(S_{21}S_{12})|$. The scattering matrix determinant is calculated as follows: $\Delta=det\ S=s_{11}s_{22}-s_{12}s_{21}$, where for lossy lines $\Delta=e^{-2(\alpha l+j\beta l)}$ and $|\Delta|=e^{2\alpha l}<1$.

TABLE 2

Comparisons of Disclosed Compositions and Commercial Materials

| Thermoplastic Composite | Filler Amount | Frequency (GHz) | Permittivity | Tan δ |
|---|---|---|---|---|
| ABS—$Ba_{0.55}Sr_{0.45}TiO_3$ (fired 1340° C.) | 6% v/v | 17 | 3.98 | 0.0086 |
| COP—$MgCaTiO_2$ (fired 1100° C.) | 25% v/v | 17 | 4.74 | 0.0018 |
| COP—$Ba_{0.55}Sr_{0.45}TiO_3$ (fired 1340° C.) | 25% v/v | 10 | 4.88 | 0.0071 |
| COP—$TiO_2$ (fired 1100° C.) | 30% v/v | 17 | 4.57 | 0.0014 |
| ABS—$Ba_{0.64}Sr_{0.36}TiO_3$ | 30% v/v | 15 | 6.7 | 0.0368 |
| ABS—$BaTiO_3$ | 27% v/v | 15 | 7 | 0.0342 |
| PP—$CaTiO_3$ | 27% v/v | 15 | 5 | 0.0051 |
| ABS—$BaTiO_3$ | 32.4% v/v | 15 | 11.04 | 0.0303 |
| COP—$Ba_{0.55}Sr_{0.45}TiO_3$ (fired 1100° C.) | 50% w/v | 16 | 8.48 | 0.0099 |
| COP—$TiO_2$ (fired 1100° C.)[a] | 30% w/v | 13 | 5.37 | 0.0030 |
| COP—$TiO_2$ (fired 1100° C.)[a] | 40% w/v | 16 | 7.35 | 0.0019 |
| COP—$TiO_2$ (fired 1100° C.)[a] | 50% w/v | 13 | 12.01 | 0.0030 |
| PREPERM ® 3D ABS300 | N/A | 2.4 | 3 | 0.004 |
| PREPERM ® 3D ABS400 | N/A | 2.4 | 4 | 0.004 |
| PREPERM ® 3D ABS450 | N/A | 2.4 | 4.5 | 0.004 |
| PREPERM ® 3D ABS550 | N/A | 2.4 | 5.5 | 0.004 |
| PREPERM ® 3D ABS650 | N/A | 2.4 | 6.5 | 0.004 |
| PREPERM ® 3D ABS750 | N/A | 2.4 | 7.5 | 0.004 |
| PREPERM ® 3D ABS1000 | N/A | 2.4 | 10 | 0.004 |

[a]Experimental samples prepared according to the present disclosure.

Humidity Testing

A MicroClimate 3 Compact system from Cincinnati Sub-Zero (CSZ) was used for humidity and temperature control and a Keysight ENA E5063A network analyzer (100 kHz-18 GHz) was used for s-parameter measurements. WR-62 rectangular waveguides from Maury Microwave were used as an intermediate transmission line between ENA ports (SMA) and a 3D printed DWG. SSLT calibration was performed on waveguide ports and then WR-62 extenders were added to keep the calibration planes largely un-affected by the tapered sections of the DWG.

Figure 12A:
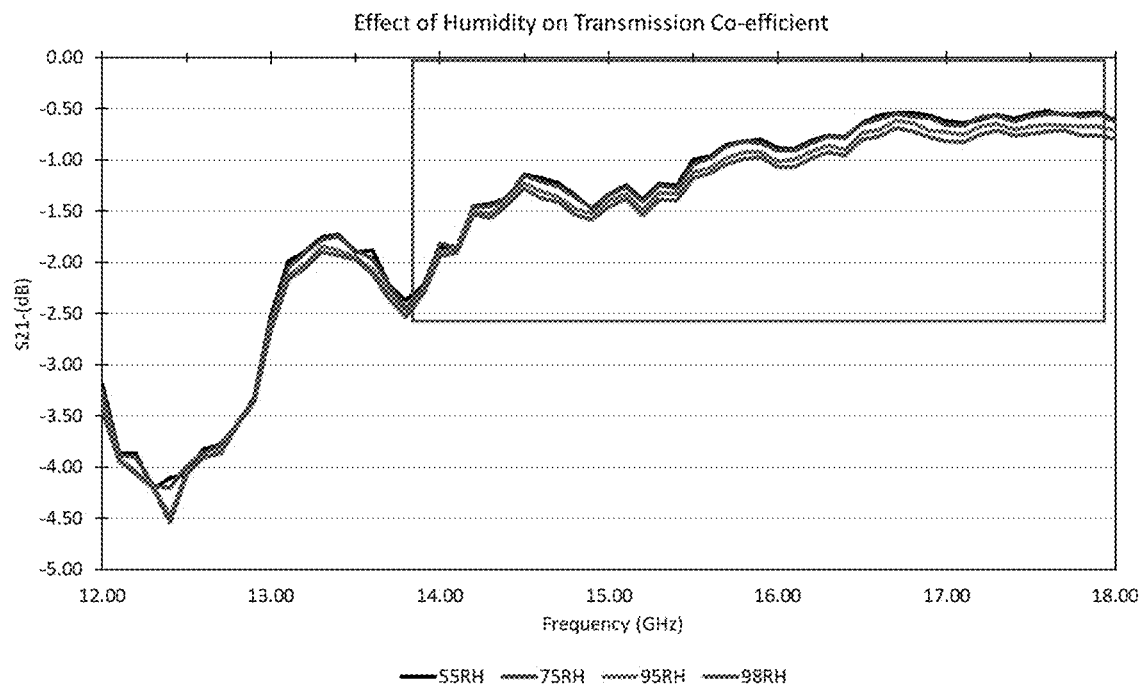
FIGS. 12A-12B show transmission loss at different relative humidity levels at 35° C. for a DWG 3D printed from an exemplary composite filament as disclosed herein.
Figure 12B:
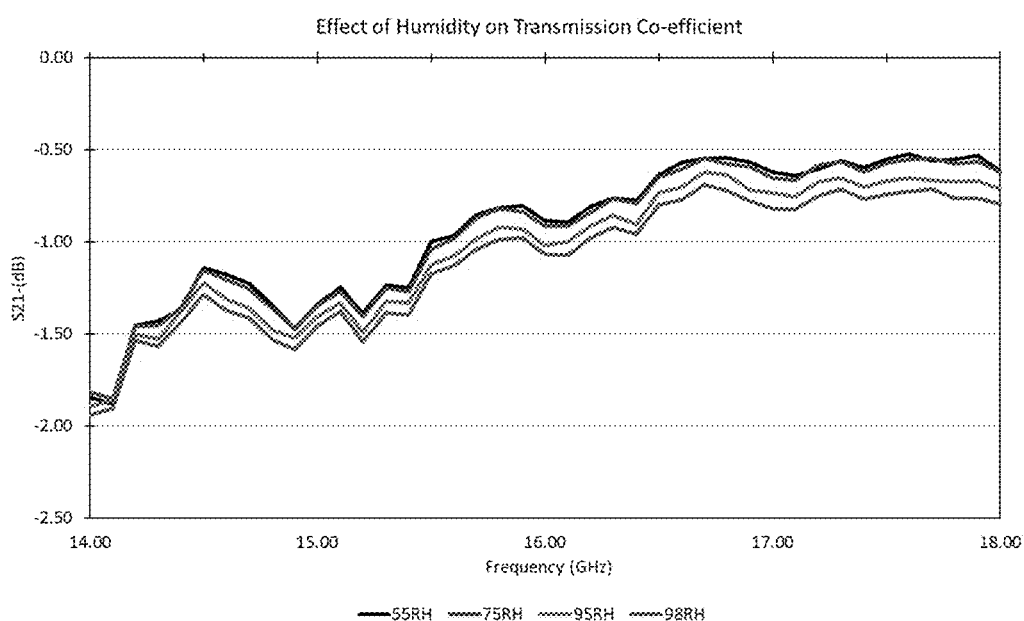

FIGS. 12A-12B show transmission loss at different relative humidity levels at 35° C. for a DWG 3D printed from an exemplary composite filament as disclosed herein. FIG. 12B is an expanded view of the boxed area in FIG. 12A.

Figure 13A:
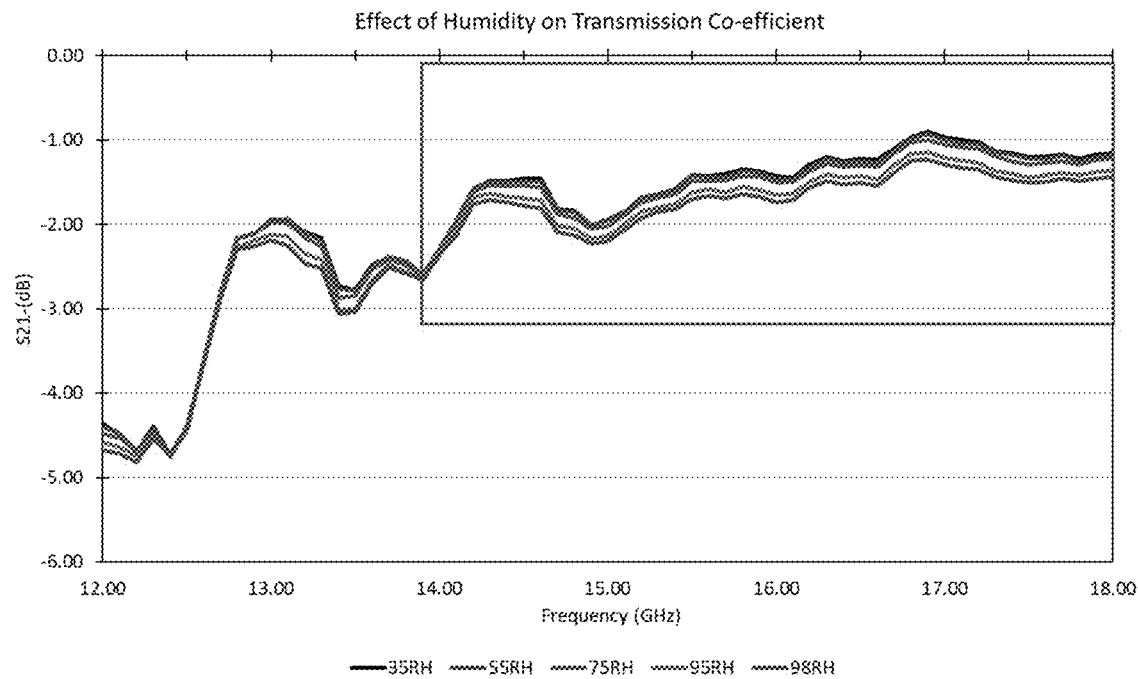
FIGS. 13A-13B show transmission loss at different relative humidity levels at 35° C. for a DWG 3D printed from a premixed commercial ABS filament as disclosed herein.
Figure 13B:
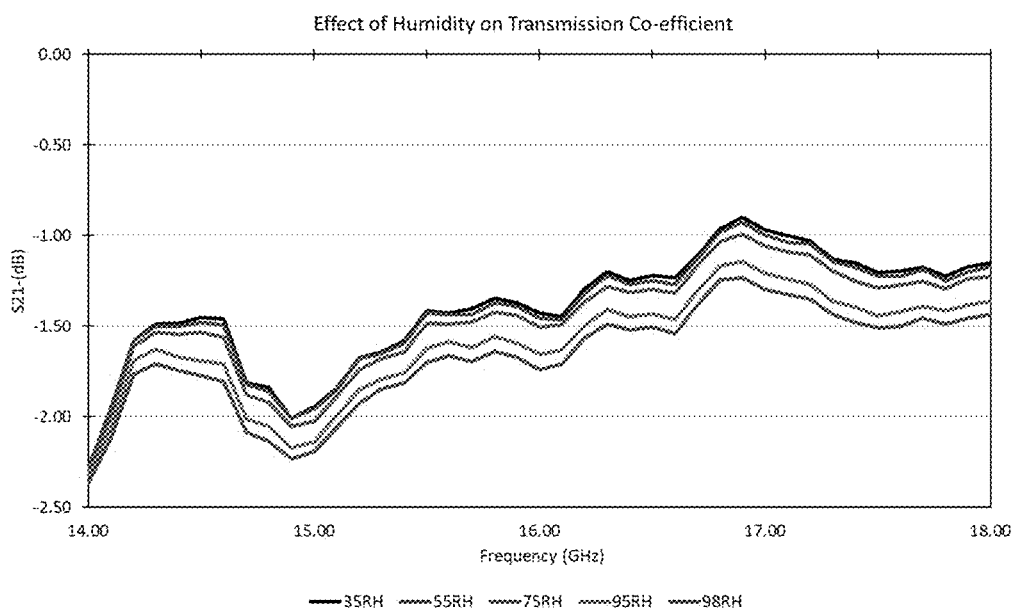

FIGS. 13A-13B show transmission loss at different relative humidity levels at 35° C. for a DWG 3D printed from a premixed commercial ABS filament as disclosed herein. FIG. 13B is an expanded view of the boxed area in FIG. 13A. Comparative results are presented in Table 3:

TABLE 3

Effects of Increasing Relative Humidity (RH) at 35° C. on Transmission Coefficient

| | Max $S_{21}$ | | | | | | | |
|---|---|---|---|---|---|---|---|---|
| Sample | Start (Room Humidity, 20%) | 35% (RH) | 55% (RH) | 75% (RH) | 85% (RH) | 95% (RH) | 98% (RH) | Δ |
| 30S (Disclosed Composite) | −0.50 | N/A | −0.52 | −0.55 | −0.56 | −0.62 | −0.69 | −0.19 |
| Commercial Premix (ABS 450) | −0.92 | −0.90 | −0.93 | −0.99 | N/A | −1.14 | −1.23 | −0.33 |

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A composite material comprising:
a polymer matrix composed of a material selected from the group consisting of a cycloolefin polymer (COP), polystyrene, polypropylene, acrylonitrile butadiene styrene (ABS), polyester, acetal copolymer polyoxymethylene, acetal homopolymer polyoxymethylene, polyacetal, polyacrylonitrile, polyamide-imide, polyaryletherketone, polybutadiene, polybutylene, polydicyclopentadiene, polyketone, polyetheretherketone, polyetherimide, polyethersulfone, polyphenylene oxide, polyphenylene sulfide, polyphthalamide, polysulfone, polyvinylidene chloride, and combinations thereof; and
calcined ceramic particles dispersed throughout the polymer matrix, wherein the calcined ceramic particles comprise a surfactant coating and the calcined ceramic particles are composed of a material selected from the group consisting of $TiO_2$, $Al_3Mg_3B_{56}$, $(AlN)_x \cdot (Al_2O_3)_{1-x}$, $BaTiO_3$, $BeO$, $Bi_2Sr_2Ca_{n-1}Cu_nO_{2n+4+x}$, $Bi_{12}TiO_{20}$, $Bi_4Ti_3O_{12}$, $Bi_2Ti_2O_7$, $3CaO \cdot Al_2O_3$, $12CaO \cdot 7Al_2O_3$, $CaO \cdot Al_2O_3$, $CaO \cdot 2Al_2O_3$, $CaO \cdot 6Al_2O_3$, $CeB_6$, $Dy_2Ti_2O_7$, $GeO_2$, $HfB_2$, $Ga_5La_3O_{14}Si$, $LaB_6$, $La_{1-x}Sr_xMnO_3$, $LaYbO_3$, $Pb(Sc_xTa_{1-x})O_3$, $Pb(Zr_xTi_{1-x})O_3$, $MgB_2$, $MgO$, $MoSi_2$, $NbB_2$, $SiB_3$, $SiB_4$, $SiB_6$, $SiC$, $SiO_2$, $Si_3N_4$, $Si_2N_2O$, $Na_{0.5}Bi_{0.5}TiO_3$, $SrTiO_3$, $WSi_2$, $W_2N$, $WN$, $WN_2$, $YBa_2Cu_3O_7$, $ZnO$, $ZrO_2$, $Ba_{0.55}Sr_{0.45}TiO_3$, $MgCaTiO_2$, $Ba_{0.64}Sr_{0.36}TiO_3$, $CaTiO_3$ and combinations thereof, wherein the calcined ceramic particles are present in an amount of from about 15 vol % to about 80 vol % of the composite material.

2. The composite material of claim 1, wherein the surfactant is present in an amount of from about 0.1 mL to about 1 mL per 10 g of calcined ceramic particles.

3. The composite material of claim 1, wherein the surfactant comprises an aminosilane having the formula

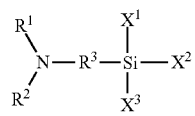

where $R^1$ and $R^2$ are independently, an alkyl group or hydrogen; $R^3$ is an alkylene group; and $X^1$, $X^2$, and $X^3$ are, independently, $R^4$, $R^5$, $R^6$, $OR^4$, $OR^5$, $OR^6$, where $R^4$, $R^5$, and $R^6$ are hydrogen or an alkyl group.

4. The composite material of claim 1, further comprising at least one additive.

5. The composite material of claim 4, wherein the at least one additive comprises a maleic anhydride grafted polypropylene wax.

6. The composite material of claim 1, wherein the calcined ceramic particles comprise calcined $TiO_2$ in an amount of from about 30 vol %, the polymer matrix comprises cycloolefin copolymer, the surfactant comprises γ-aminopropyltriethoxysilane, and the at least one additive comprises a maleic anhydride grafted polypropylene wax in an amount of about 5 vol %.

7. The composite material of claim 1, wherein the composite material has a permittivity of from about 4.85 to about 12 when an electromagnetic signal comprising a frequency of from about 4 GHz to about 26.5 GHz is applied to the composite material.

8. The composite material of claim 1, wherein the composite material has a loss tangent of from about 0.0015 to about 0.0035 when an electromagnetic signal comprising a frequency of from about 4 GHz to about 26.5 GHz is applied to the composite material.

9. The composite material of claim 1, wherein the composite material has a dielectric constant of from about 5 to about 12.01 when an electromagnetic signal comprising a frequency of from about 4 GHz to about 26.5 GHz is applied to the composite material.

10. The composite material of claim 1, wherein the composite material has a coefficient of thermal expansion (CTE) of from about 28 ppm/° C. to about 75 ppm/° C. from a temperature of about 40° C. to a temperature of about 120° C.

11. The composite material of claim 1, wherein the composite material has a glass transition temperature of from about 105° C. to about 125° C.

12. The composite material of claim 1, wherein transmission loss for the composite material at 25° C. and 98% relative humidity is within 20% of the transmission loss for the composite material at 25° C. and room humidity at 17 GHz.

13. The composite material of claim 3 wherein the aminosilane is selected from the group consisting of γ-aminopropyltriethoxysilane, γ-aminopropyldiethoxymethylsilane, γ-aminopropyldimethylethoxysilane, γ-aminopropyltrimethoxysilane, γ-aminopropyltriethoxysilane, γ-aminopropyldiethoxymethylsilane, γ-aminopropyldimethylethoxysilane, γ-aminopropyltrimethoxysilane, and combinations thereof.

14. The composite material of claim 13 wherein the calcined ceramic particles are composed of a material selected from the group consisting of $TiO_2$, $Ba_{0.55}Sr_{0.45}TiO_3$, $MgCaTiO_2$, $Ba_{0.64}Sr_{0.36}TiO_3$, $CaTiO_3$ and combinations thereof.

15. The composite material of claim 14 wherein the polymer matrix is composed of a material selected from the group consisting of cycloolefin polymer (COP), polypropylene, acrylonitrile butadiene styrene (ABS), and combinations thereof.

16. The composite material of claim 15 wherein the composite material has a property selected from the group consisting of
(i) a permittivity from 4.85 to 12 when an electromagnetic signal comprising a frequency from 4 GHz to 26.5 GHz is applied to the composite material,
(ii) a loss tangent from 0.0015 to 0.0035 when an electromagnetic signal comprising a frequency from 4 GHz to 26.5 GHz is applied to the composite material,
(iii) a dielectric constant from 5 to 12.01 when an electromagnetic signal comprising a frequency from 4 GHz to 26.5 GHz is applied to the composite material, and
(iv) combinations thereof.

17. A composite material comprising:

a polymer matrix composed of a material selected from the group consisting of a cycloolefin polymer (COP), polypropylene, acrylonitrile butadiene styrene (ABS), and combinations thereof;

calcined ceramic particles dispersed throughout the polymer matrix, wherein the calcined ceramic particles comprise a surfactant coating and the calcined ceramic particles are composed of a material selected from the group consisting of $TiO_2$, $Ba_{0.55}Sr_{0.45}TiO_3$, $MgCaTiO_2$, $Ba_{0.64}Sr_{0.36}TiO_3$, or $CaTiO_3$; and a maleic anhydride grafted polypropylene wax, wherein the calcined ceramic particles are calcined at a temperature of at least 1100° C. prior to dispersal in the polymer matrix, wherein the calcined ceramic particles are present in an amount of from about 15 vol % to about 80 vol % of the composite material, wherein the surfactant is γ-aminopropyltriethoxysilane, wherein the surfactant is present in an amount of from about 0.1 ml to about 1 mL per 10 g of calcined ceramic particles, and wherein the composite material has a loss tangent of from about 0.0015 to about 0.0035 when an electromagnetic signal comprising a frequency of from about 4 GHz to about 26.5 GHz is applied to the composite material.

18. A composite material comprising:

a polymer matrix composed of a cycloolefin polymer (COP);

calcined ceramic particles dispersed throughout the polymer matrix, wherein the calcined ceramic particles comprise a surfactant coating and the calcined ceramic particles are composed of $TiO_2$; and a maleic anhydride grafted polypropylene wax, wherein the calcined ceramic particles are calcined at a temperature of at least 1100° C. prior to dispersal in the polymer matrix, wherein the calcined ceramic particles are present in an amount of from about 20 vol % to about 60 vol % of the composite material, wherein the surfactant is γ-aminopropyltriethoxysilane, wherein the surfactant is present in an amount of from about 0.1 ml to about 1 ml per 10 g of calcined ceramic particles.

* * * * *